United States Patent [19]

Maeda

[11] Patent Number: 5,791,157
[45] Date of Patent: Aug. 11, 1998

[54] HEAT PUMP DEVICE AND DESICCANT ASSISTED AIR CONDITIONING SYSTEM

[75] Inventor: Kensaku Maeda, Fujisawa, Japan

[73] Assignee: Ebara Corporation, Tokyo, Japan

[21] Appl. No.: 783,042

[22] Filed: Jan. 14, 1997

[30] Foreign Application Priority Data

| Jan. 16, 1996 | [JP] | Japan | 8-004681 |
| Jan. 16, 1996 | [JP] | Japan | 8-004691 |
| Jan. 18, 1996 | [JP] | Japan | 8-006710 |
| Jan. 22, 1996 | [JP] | Japan | 8-008180 |
| Jan. 22, 1996 | [JP] | Japan | 8-008222 |
| Sep. 27, 1996 | [JP] | Japan | 8-277543 |

[51] Int. Cl.$^6$ ........................... F25B 15/00
[52] U.S. Cl. .................. 62/483; 62/141; 62/101
[58] Field of Search ............... 62/101, 476, 103, 62/141, 483

[56] References Cited

U.S. PATENT DOCUMENTS

| 2,700,537 | 1/1955 | Pennington . | |
| 4,171,619 | 10/1979 | Clark | 62/235.1 |
| 4,269,041 | 5/1981 | Holldorff | 62/476 |
| 4,481,783 | 11/1984 | Pecz et al. | 62/101 |
| 4,505,133 | 3/1985 | Malewski et al. | 62/476 |
| 4,531,374 | 7/1985 | Alefeld . | |
| 4,887,438 | 12/1989 | Meckler . | |
| 4,905,479 | 3/1990 | Wilkinson . | |
| 4,955,931 | 9/1990 | Mucic | 62/238.3 |
| 4,967,566 | 11/1990 | Bergmann et al. | 62/101 |
| 5,325,676 | 7/1994 | Meckler . | |
| 5,448,895 | 9/1995 | Coellner et al. . | |
| 5,600,967 | 2/1997 | Meckler | 62/476 |

*Primary Examiner*—William Doerrler
*Attorney, Agent, or Firm*—Armstrong, Westerman, Hattori, McLeland & Naughton

[57] ABSTRACT

A high efficiency air conditioning system combining a desiccant assisted air conditioner with a heat pump device is disclosed. The heat pump device has a desorber for separating a refrigerant vapor from an absorption fluid; a compressor for compressing the refrigerant vapor; an absorber for absorbing the refrigerant vapor in the absorption fluid; an absorption fluid passage for circulating the absorption fluid between the absorber and the desorber; a refrigerant compression passage for transporting the refrigerant vapor produced in the desorber to the absorber by way of the compressor; and a heat medium passage means for drawing out heat of absorption and heat of desorption generated in the absorber and/or the desorber. Facilities are provided for storing refrigerant and absorption fluid during various modes of system operation and appropriate valving is provided for operating the system in various modes to increase the economic efficiency of system utilization.

14 Claims, 22 Drawing Sheets

HEAT PUMP DEVICE AND DESICCANT ASSISTED AIR CONDITIONING SYSTEM

BACKGROUND OF THE INVENTION

1. Field of the Invention

The present invention relates in general to desiccant assisted air conditioners, and relates in particular to a desiccant assisted air conditioning system having a heat pump device to provide a heat accumulation function and serving as a heat source for regeneration of desiccant material and as a cooling source for cooling process air.

2. Description of the Related Art

Desiccant assisted air conditioning apparatus is well known, for example in a U.S. Pat. No. 2,700,537. The system discloses a desiccant assisted air conditioning apparatus requiring a heat source in a temperature range of 100°~150° C. for regenerating the desiccant (moisture adsorbent), and heat sources such as electric heaters and boilers are primarily utilized. In recent years, desiccants which can be regenerated at lower temperatures in a range of 60°~80° C. have been developed, enabling the use of heat sources operating at lower temperatures.

FIG. 21 is a schematic representation of a typical example of such improved desiccant assisted apparatus combining a known motor-driven vapor compression heat pump (including refrigerating machine), and FIG. 22 is a psychrometric chart showing the operation of this example apparatus. In FIG. 21, the reference numeral 101 refers to a conditioning space; 102 refers to a blower; 103 refers to a desiccant wheel including desiccant material alternatingly communicatable with the process air and regeneration air; 104 refers to a sensible heat exchanger; 105 refers to a humidifier; 106 refers to a water supply pipe for the humidifier; 107~112 refer to air passages for process air; 140 refers to a blower for the regeneration air; 220 refers to a condenser as well as a heat exchanger between refrigerant and regeneration air (heating device); 121 refers to a sensible heat exchanger; 124~129 refer to air passages for regeneration air; 201~204 refer to cooling refrigerant passages. Numeral 240 refers to an evaporator for working as a heat exchanger between refrigerant and process air (cooling device). In FIG. 21, circled letters K~V represent the thermodynamic state of the air medium being processed to correspond to respective sites shown in FIG. 22. SA designates supply air, RA designates return air, OA designates outside air and EX designates exhaust air.

The operation of such an apparatus will be explained in the following. In FIG. 21, the ambient air from the room 101 to be conditioned (process air) is drawn through a passage 107 into a blower 102 to be pressurized and is forwarded to a desiccant wheel 103 through a passage 108. In the desiccant wheel 103, the humidity ratio of the ambient air is lowered by the removal of moisture from the ambient air to the moisture adsorbent in the desiccant wheel 103. During the process of adsorption, the heat of adsorption is released into the process air which rises in temperature. The process air with a warmer temperature and a lower humidity is forwarded through the passage 109 to the sensible heat exchanger 104, and is cooled by heat exchange with outside air (regeneration air). Then the cooled air is forwarded to an evaporator 240 through a passage 110 to be further cooled by the heat pump device and is forwarded to a humidifier 105 through a passage 112 to be cooled by water spraying or evaporative humidification in an isenthalpic process and is returned to the conditioning room 101 through a passage 113.

The desiccant material adsorbs moisture during this process and needs to be regenerated. In this example, this is performed as follows. Outside air (regeneration air) OA is drawn into the blower 140 through a passage 124 to be pressurized and forwarded to the sensible heat exchanger 104. This outside air cools the process air and, in the process, raises its own temperature. The warm air OA flows into a next sensible heat exchanger 121 through a passage 125 and raises its temperature by heat exchange with the spent high temperature regeneration air after regeneration. The regeneration air from the heat exchanger 121 flows into a condenser 220 through a passage 126 so that it is heated by heat of condensation of the heat pump device to raise its temperature to a range of 60°~80° C., and its relative humidity is lowered. The regeneration air with a lowered humidity passes through the desiccant wheel 103 to remove the moisture from the desiccant wheel. Spent air from the desiccant wheel 103 flows through a passage 128 to enter the sensible heat exchanger 121 to preheat the regeneration air prior to regeneration, and flows through a passage 129 to be exhausted externally.

The above process can be explained with reference to the psychrometric chart shown in FIG. 22. The ambient air in room 101 to be air conditioned (process air: state K) is drawn into the blower 102 through the passage 107 to be pressurized, and flows through the passage 108 to reach the desiccant wheel 103 so that its humidity ratio will be lowered by adsorption of moisture to the moisture adsorbent in the desiccant wheel while its temperature rises (state L) by the heat of adsorption. The air with a lower humidity and a higher temperature flows through the passage 109 to reach the sensible heat exchanger 104, and is cooled by heat exchange with the regeneration air (state M). The cooled air flows through a passage 110 to reach the evaporator 240 to be further cooled by the heat pump device (state N) and is forwarded to a humidifier 105 through a passage 111 so that its temperature is lowered in an isenthalpic manner by water spraying or evaporative humidification (state P), and is returned through the passage 112 to the conditioning space 101. In the above manner, an enthalpy difference is produced between return air (state K) in the room and supply air (state P) for use for cooling of the conditioning space 101.

The desiccant is regenerated as follows. Outside air (OA: state Q) is drawn through the passage 124 into the blower 140, is pressurized, forwarded to the sensible heat exchanger 104, cools the process air and raises its own temperature (state R), flows into the passage 125 and the next heat sensible exchanger 121, exchanges heat with the spent high temperature air so that its own temperature rises (state S). Regeneration air from the sensible heat exchanger 121 flows through the passage 126 to reach the condenser 220 and is heated by the heat of condensation of the heat pump device to a temperature between 60°~80° C., so that its relative humidity is lowered (state T). The regeneration air having a lowered humidity flows through the desiccant wheel 103 thereby removing adsorbed moisture (state U). Spent outgoing air from the desiccant wheel 103 flows through the passage 129 to reach the sensible heat exchanger 121 to preheat the regeneration air prior to regeneration process, and lowers its own temperature (state V) and flows into the passage 129 to be exhausted out as waste air. The processes of regeneration of desiccant and dehumidification and cooling of the ambient air described above is repeatedly performed to provide the desiccant assisted air conditioning process. Thus, the regeneration air is defined as air to be humidified, and the process air is defined as air to be dehumidified in this specification.

In the desiccant assisted air conditioning system having such a configuration, the vapor compression refrigeration process combined with the desiccant regeneration cycle requires a condensation temperature of about 80° C. In recent years, it has become desirable to replace CFC (chlorofluorocarbon) refrigerant with more environmentally acceptable ammonia as refrigerant in the vapor compression refrigeration cycling units; however, if it is desired to attain the condensation temperature in this range, the pressure requirement increases to an abnormally high range of about 42 Kg/cm$^2$, resulting in an expensive air conditioning system to provide the necessary pressure endurance.

Therefore, there has been a need to develop a desiccant assisted air conditioning system to enable operation of the working fluid at low refrigerant pressures while offering high reliability, environmental compatibility and low cost.

SUMMARY OF THE INVENTION

It is an object of the present invention to provide a highly reliable air conditioning system which can be operated by commonly available compressors and produce a higher energy utilization efficiency in desiccant assisted air conditioning process while offering an economical cost of purchase as well as operation.

The above-described object has been accomplished by a heat pump device comprising: a desorber for separating a refrigerant as vapor from an absorption fluid; a compressor for compressing the refrigerant vapor; an absorber for absorbing the refrigerant vapor into the absorption fluid; an absorption fluid passage for circulating the absorption fluid between the absorber and the desorber; a refrigerant compression passage for transporting the refrigerant vapor produced in the desorber to the absorber by way of the compressor; a heat medium passage means for drawing out heat of absorption and heat of desorption generated in the absorber and/or the desorber; and a chemical potential adjusting device for adjusting concentration of the absorption fluid, the chemical potential adjusting device comprising a condenser heat-exchangeable with the absorption fluid in the desorber for condensing the refrigerant vapor, a refrigerant condensation passage for transporting at least a portion of the refrigerant vapor compressed by the compressor to the condenser, and a refrigerant storage space for storing the refrigerant condensed in the condenser.

DESCRIPTION OF THE PREFERRED EMBODIMENTS

Figure 1:
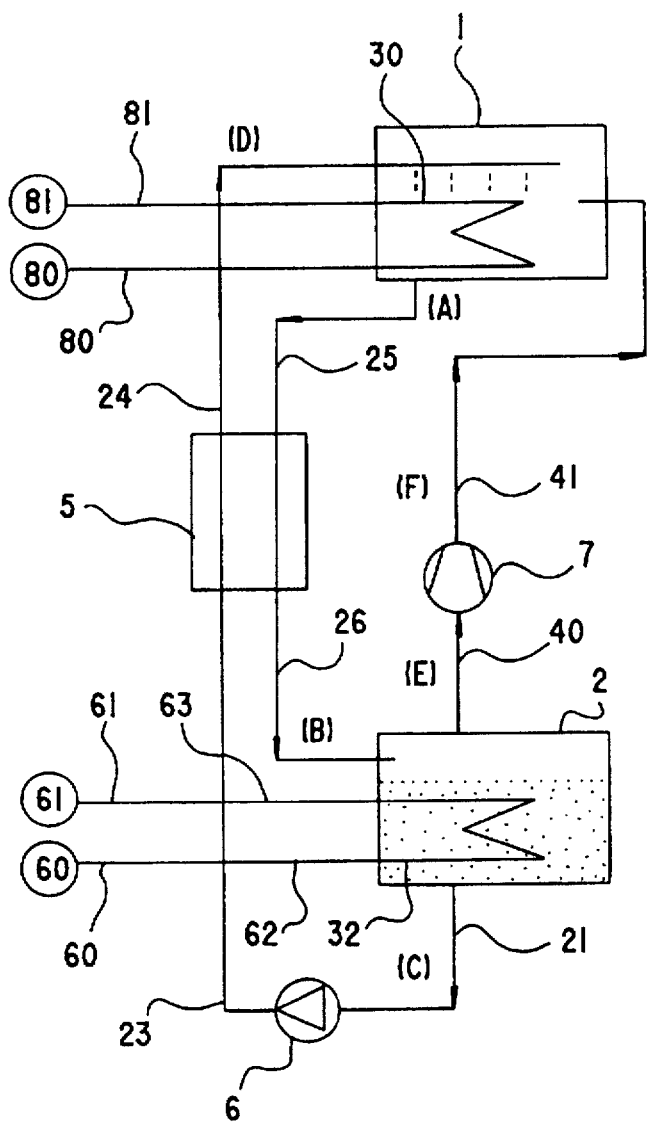
FIG. 1 is a schematic representation of a heat pump portion of a first embodiment of the desiccant assisted air conditioning apparatus of the present invention.
Figure 2:
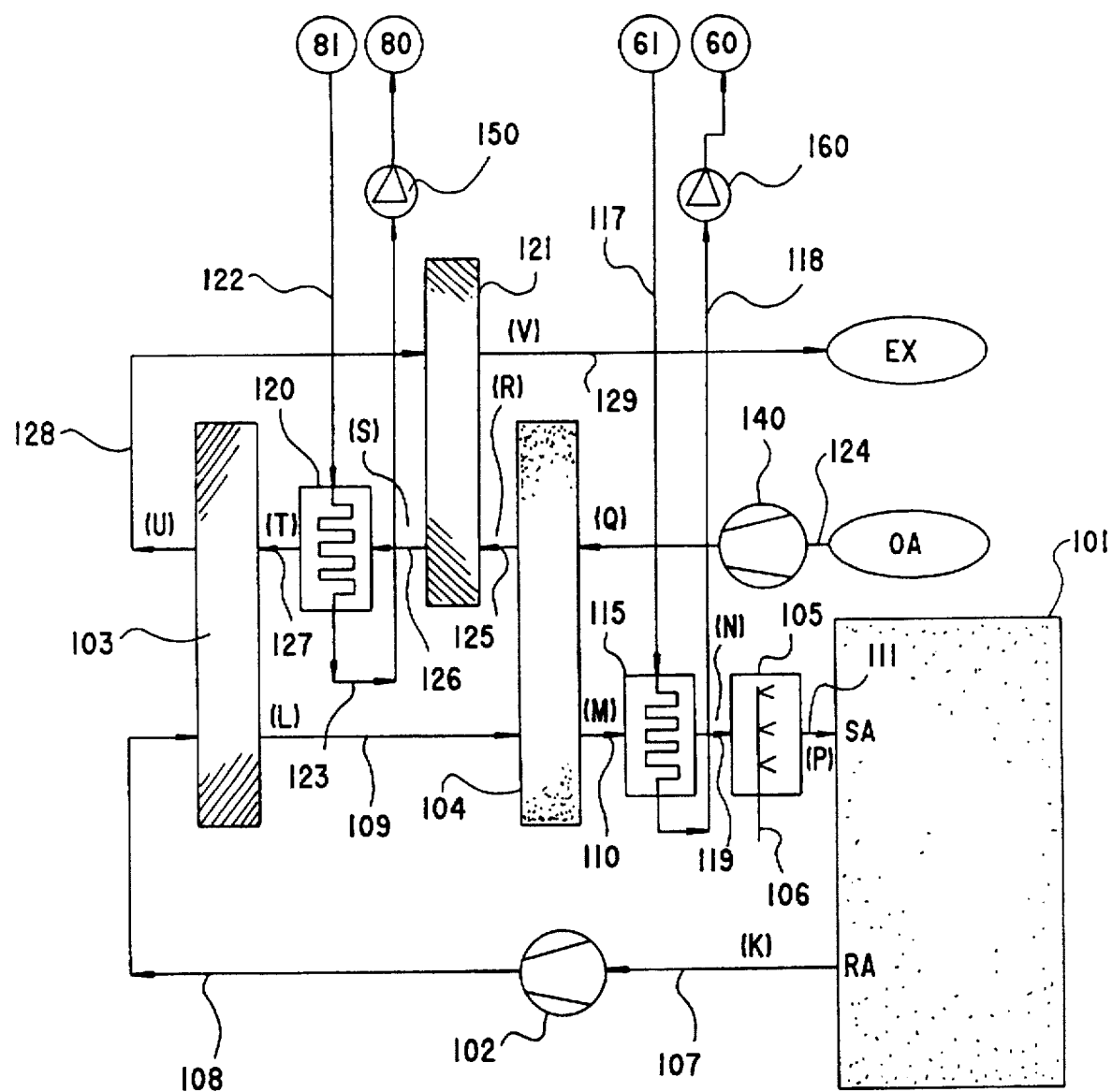
FIG. 2 is a schematic representation of an air conditioner portion of the first embodiment of the desiccant assisted air conditioning apparatus of the present invention.
Figure 3:
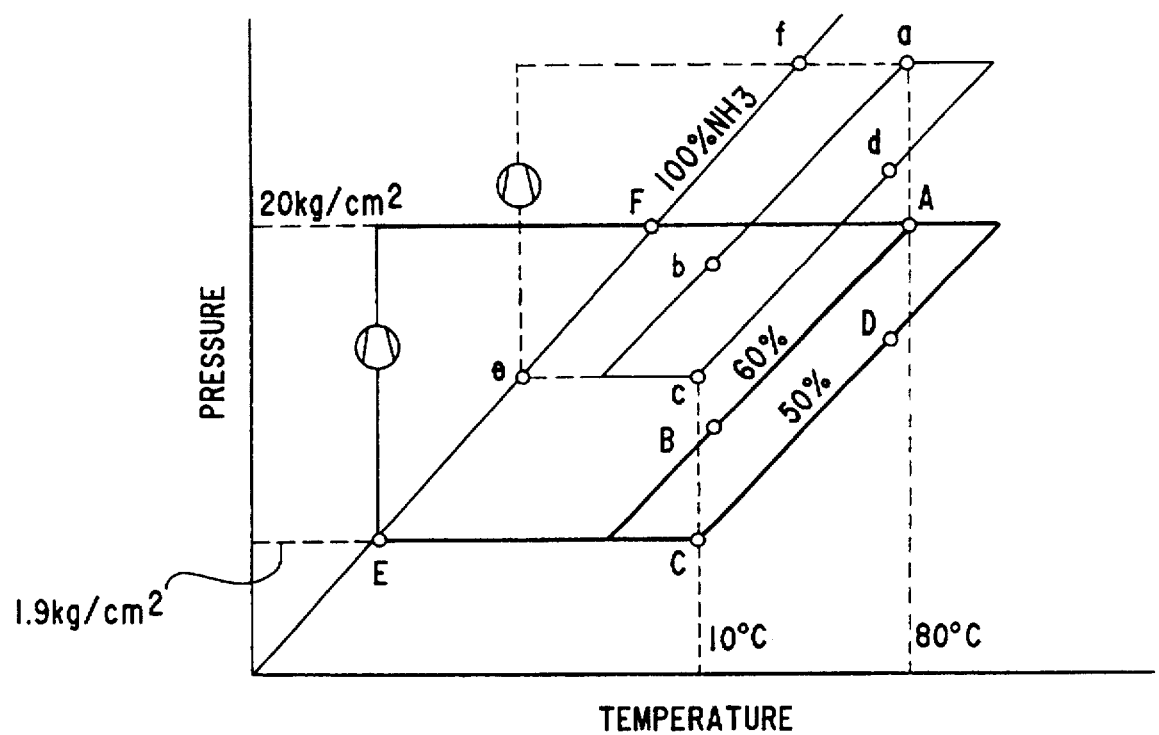
FIG. 3 is a Duhring's diagram showing the operational cycles of the hybrid heat pump device of the first embodiment.

A first embodiment will be presented with reference to FIGS. 1 to 3.

FIG. 1 is a schematic representation of the basic configuration of the heat pump device section of the desiccant assisted air conditioning system of the present invention, and FIG. 2 is a schematic representation of the basic configuration of the desiccant assisted air conditioner to be combined with the heat pump device. FIG. 3 is a Duhring's diagram showing the operation of the heat pump device shown in FIG. 1, having water as the absorbent and ammonia as the refrigerant. In FIG. 3, the horizontal axis represents the temperature of the absorption fluid, a mixture of the absorbent and the refrigerant, and the vertical axis represents the refrigerant pressure.

The heat pump device shown in FIG. 1 comprises: an absorber 1 for absorption of the refrigerant vapor in the absorption fluid; a desorber 2 for separation of the refrigerant vapor from the absorption fluid; and a compressor 7 for compressing the refrigerant vapor; including the absorption fluid passages 21, 23, 24, 25 and 26 for circulating the absorption fluid between the absorber 1 and the desorber 2, as well as the vapor passages 40, 41 to transport the vapor of the refrigerant generated in the desorber 2 and compressed in the compressor 7, to the absorber 1.

The operation of the heat pump device is as follows. The fluid exiting the desorber 2 is withdrawn into the pump 6 through the passage 21 to increase its pressure, and the pressurized fluid passes through the passage 23 to exchange heat in the heat exchanger 5 with the returning fluid from the absorber 1, and flows into the absorber 1 through the passage 24. In the absorber 1, the refrigerant vapor (ammonia) delivered from the compressor is absorbed into the absorption fluid to dilute or weaken it, and the heat of absorption generated is given off to the hot water through the heat transfer tube 30. The fluid is delivered to he heat exchanger 5 through the passage 25, and after exchanging eat with the concentrated absorption fluid exiting the desorber 2, returns to the desorber 2 through the passage 26. In the desorber 2, the refrigerant (ammonia) vapor is generated by the sucking action of the compressor 7, and the heat of desorption is supplied by the cooling medium (chilled water) through the heat transfer tube 32. This is how the fluid circulates in the absorption fluid circulation passage. The compressor 7 withdraws the refrigerant vapor from the desorber 2 through the passage 40, and forwards the compressed vapor to the absorber 1 through the passage 41.

The operation of the heat pump device will be explained with reference to the Duhring's diagram shown in FIG. 3. The fluid exiting the desorber 2 (state C) is withdrawn into the pump 6 to increase its pressure, and the pressurized fluid exchanges heat (state D) in the heat exchanger 5 with the returning fluid from the absorber 1, and flows into the absorber 1. In the absorber 1, the refrigerant (ammonia) vapor from the compressor 7 is absorbed in the absorption fluid, thus weakening the fluid, and after discharging the heat of absorption (state A) through the heat transfer tube 30 to the hot water, reaches the heat exchanger 5 through the passage 25, wherein heat is exchanged (state B) with the concentrated absorption fluid from the desorber to return to the desorber 2. In the desorber 2, under the action of the compressor 7, the refrigerant (ammonia) is generated and the refrigerant concentration is reduced and the absorption fluid becomes more concentrated or strong. The absorption fluid circulates in the passages of the heat pump device as described above, thus completing a sorption heat pump cycle. The compressor 7 withdraws the refrigerant vapor from the desorber 2 (state E) and after compressing the vapor (state F), delivers it to the absorber 1.

The concentration of the fluid shown in FIG. 3 is an example of state of working fluid during the operation of the heat pump device. The desiccant air conditioning unit to be incorporated in the present air conditioning system requires a heat source for cooling which is chilled water at about 15° C. and a heat source which is hot water at about 75° C. for heating the regeneration air. Therefore, considering the temperature difference necessary for heat transfer, the sorption temperature of the heat pump device of about 10° C. is needed, and the absorption temperature of about 80° C. is needed. An example of a cycle which satisfies such conditions of operation is shown by a line indicated by the points A, B, C, D, E, and F. In the Duhring's diagram, this means that point A relating the outlet of the absorber should be at 80° C., and that point C relating the outlet of the desorber should be at 10° C. to obtain hot water of about 75° C. from the absorber and chilled water of about 15° C. from the desorber.

The operation of the compressor 7 to achieve the above conditions will result in generating hot water from the absorber 1, and chilled water from the desorber 2, and the hot water and chilled water thus produced are routed to the desiccant assisted air conditioner shown in FIG. 2, through the inlet/outlet 60, 61 of the chilled water passage, and the inlet/outlet 80, 81 of the hot water passage. In the case of using ammonia in the conventional vapor compression type heat pump device and show that, to obtain the condensation temperature of 80° C., a relatively high pressure of 42 Kg/cm$^2$ is required, while in the present system, the highest pressure required is only about 20 Kg/cm$^2$. It has thus been demonstrated that the present heat pump device is able to be operated at low pressure of the working fluid.

FIG. 2 is a schematic representation of a desiccant assisted air conditioner section of the present invention. The reference numeral 101 refers to a conditioning space; 102 refers to a blower; 103 refers to a desiccant wheel including desiccant material alternatingly communicatable with the process air and regeneration air; 104 refers to a sensible heat exchanger; 105 refers to a humidifier; 106 refers to a water supply pipe for the humidifier; 107~112 refer to air passages for process air; 140 refers to a blower for the regeneration air; 120 refers to a condenser as well as a heat exchanger between refrigerant and regeneration air (heating device); 121 refers to a sensible heat exchanger; 124~129 refer to air passages for regeneration air; 117~118, 122~123 refer to cooling refrigerant passages. 115 refers to an evaporator for working as a heat exchanger between refrigerant and process air (cooling device). In FIG. 2, circled letters K~V represent the thermodynamic state of the air medium being processed to correspond to respective sites shown in FIG. 3. SA designates supply air, RA designates return air, OA designates outside air and EX designates exhaust air.

The operation of such an apparatus will be explained in the following. In FIG. 2, the ambient air from the room 101 to be conditioned (process air) is drawn through a passage 107 into a blower 102 to be pressurized and is forwarded to a desiccant wheel 103 through a passage 108. In the desiccant wheel 103, the humidity ratio of the ambient air is lowered by the removal of moisture from the ambient air to the moisture adsorbent in the desiccant wheel 103. During the process of adsorption, the heat of adsorption is released into the process air which rises in temperature. The process air with a warmer temperature and a lower humidity is forwarded through the passage 109 to the sensible heat exchanger 104, and is cooled by heat exchange with outside air (regeneration air). Then the cooled air is forwarded to a cooler (heat exchanger) 115 to be further cooled through a heat exchange process with cooling medium and is forwarded to a humidifier 105 through a passage 110 to be cooled by water spraying or evaporative humidification in an isenthalpic process and is returned to the conditioning room 101 through a passage 113.

The desiccant material adsorbed moisture during this process and needs to, be regenerated. In this example, this is performed as follows. Outside air (regeneration air) OA is drawn into the blower 140 through a passage 124 to be pressurized and forwarded to the sensible heat exchanger 104, which cools the process air and in the process raises its own temperature. The warm air OA flows into a next sensible heat exchanger 121 through a passage 125 and raises its temperature by heat exchange with the spent high temperature regeneration air after regeneration. The regeneration air from the heat exchanger 121 flows into a heater (heat exchanger) 120 through a passage 126 so that it is heated through a heat exchange process with a heating medium to raise its temperature to a range of 60°~80° C., and its relative humidity is lowered. The regeneration air with a lowered humidity passes through the desiccant wheel 103 to remove the moisture from the desiccant wheel. Spent air from the desiccant wheel 103 flows through a passage 128 to enter the sensible heat exchanger 121 to preheat the regeneration air prior to regeneration, and flows through a passage 129 to be exhausted externally.

Figure 22:
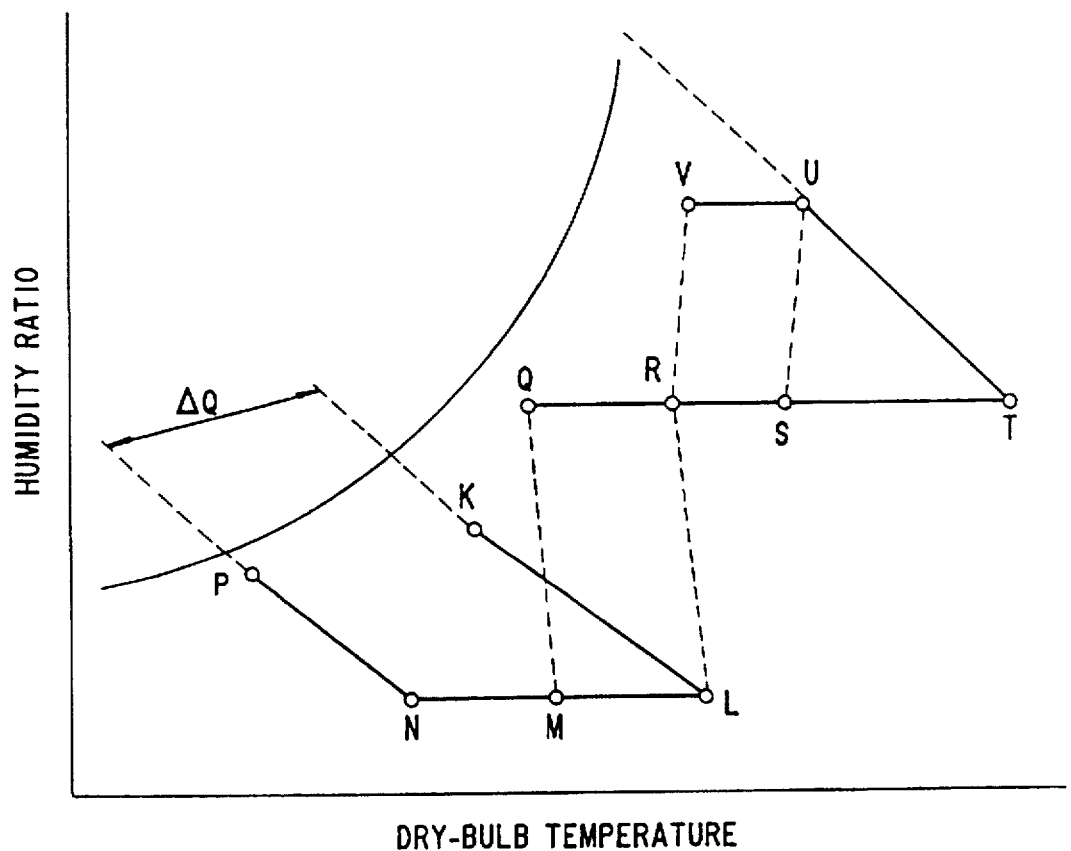
FIG. 22 is a psychrometric chart showing desiccant assisted air conditioning cycle in the conventional desiccant assisted air conditioning apparatus.

The above process can be explained with reference to the psychrometric chart shown in FIG. 22. The ambient air in room 101 to be air conditioned (process air: state K) is drawn into the blower 102 through the passage 107 to be pressurized, and flows through the passage 108 to reach the desiccant wheel 103 so that its humidity ratio will be lowered by adsorption of moisture to the moisture adsorbent in the desiccant wheel while its temperature rises (state L) by the heat of adsorption. The air with a lower humidity and a higher temperature flows through the passage 109 to reach the sensible heat exchanger 104, and is cooled by heat exchange with the regeneration air (state M). The cooled air flows through the passage 110 to reach the cooler 115 to be further cooled through a heat exchange process with cooling medium (state N) and is forwarded to a humidifier 105 so that its temperature is lowered in an isenthalpic manner by water spraying or evaporative humidification (state P), and is returned through the passage 111 to the conditioning space 101. In the above manner, an enthalpy difference is produced between return air (state K) in the room and supply air (state P) for use for cooling of the conditioning space 101.

The desiccant is regenerated as follows. Outside air (OA: state Q) is drawn through the passage 124 into the blower 140, is pressurized, forwarded to the sensible heat exchanger 104, cools the process air and raises its own temperature (state R), flows into the passage 125 and the next heat sensible exchanger 121, exchanges heat with the spent high temperature air so that its own temperature rises (state S). Regeneration air from the sensible heat exchanger 121 flows through the passage 126 to reach the heater 120 and is heated through heat exchange process with heating medium to a temperature between 60°–80° C., so that its relative humidity is lowered (state T). The regeneration air having a lowered humidity flows through the desiccant wheel 103 thereby removing adsorbed moisture (state U). Spent outgoing air from the desiccant wheel 103 flows through the passage 128 to reach the sensible heat exchanger 121 to preheat the regeneration air prior to regeneration process, and lowers its own temperature (state V) and flows into the passage 129 to be exhausted out as waste air. The processes of regeneration of desiccant and dehumidification and cooling of the ambient air described above is repeatedly performed to provide the desiccant assisted air conditioning process.

Accordingly, the desiccant assisted air conditioning system of the present invention enables cooling of air while maintaining low pressure of the working fluid in the heat pump device.

Figure 4:
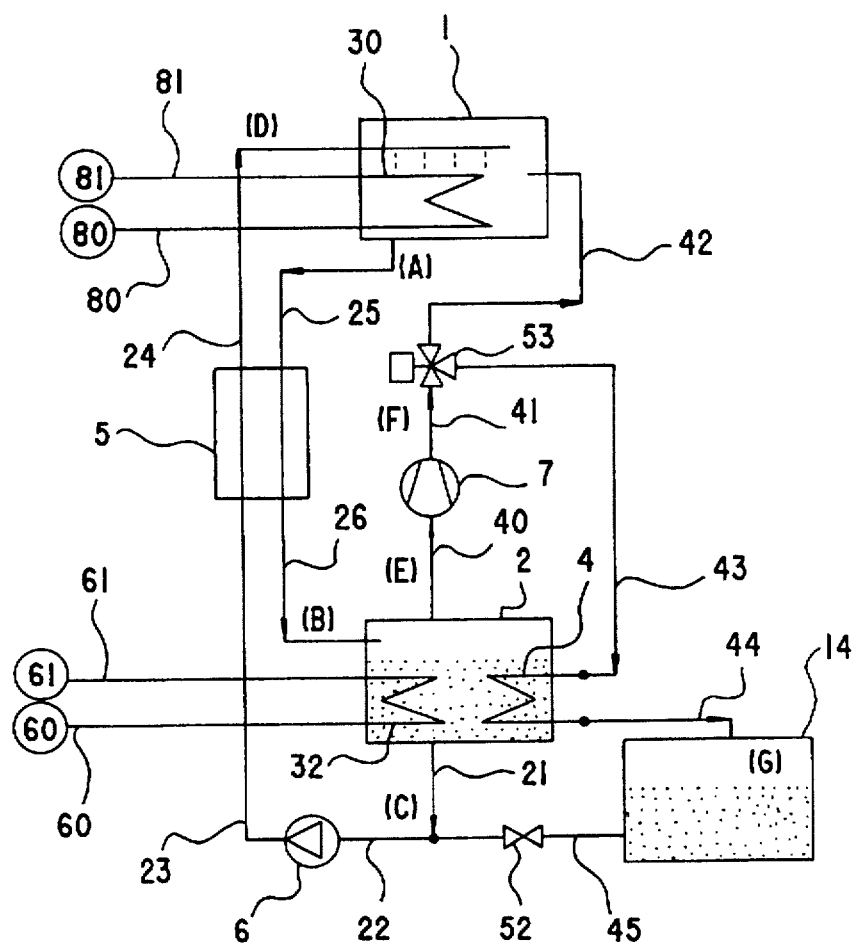
FIG. 4 is a schematic representation of a second embodiment of a heat pump device of the present invention.

A second embodiment will be presented with reference to FIG. 4. This heat pump device is provided with additional components to the hybrid system shown in FIG. 1, that is, a condenser 4 having a heat exchange relationship with the fluid from the desorber 2. In this heat pump device, the refrigerant vapor compressed in the compressor 7 can flow from the passage 41 either into passages 42 to lead to the absorber 1 or into the passage 43 to communicate with the condenser 4 by operating a three-way valve 53. The condensed refrigerant is stored in a refrigerant storage space 14 which is connected with the condenser 4 through a passage 44. The refrigerant storage space 14 is provided with a passage 45 and a valve 52 to admix the refrigerant with the absorption fluid so that, a selection of operation can be made between concentrating the absorption fluid by storing the refrigerant in the storage space 14, and weakening the absorption fluid by releasing the stored refrigerant in the absorption fluid. The desiccant assisted air conditioning section of the system is the same as that shown in FIG. 2, and explanations will be omitted.

The operation of the desiccant assisted air conditioning system of the second embodiment will be explained next. In the normal mode of operation, the three-way valve 53 is closed to the direction of the passage 43 side of the system so that the passages 41, 42 are active. In this case, the system behaves in the same manner as the hybrid system combining the heat pump device section and the desiccant conditioning section as shown in FIG. 1, and the operational cycle of the heat pump device of the system can be explained using FIG. 3, therefore, the explanations will be omitted.

Next, the process of adjusting concentration of the absorption fluid using the arrangement of the heat pump device shown in FIG. 4 will be explained which is adopted when the absorption fluid is weak. In such a case, as shown by a fine line bounded by points a, b, c, d, e and f in FIG. 3, the whole system is being operated at a relatively high pressure, and the compressor is vulnerable to overload. In this operational mode, the three-way valve 53 is closed in the direction of the passage 42 side, and the passages 41, 43 are operative. The valve 52 provided in the passage 45 is closed, and chilled water (cooling medium) is stopped while the compressor 7 and the fluid pump 6 are operated.

Under these conditions, it is not possible to send the refrigerant to the absorber 1, and the absorption effect is not operative. When the compressor 7 is operated, refrigerant vapor is generated from the fluid in the desorber, and the refrigerant vapor is compressed and flows through passages 41, 43 into the condenser 4 which is heat-exchangeable with the desorber 2. The refrigerant loses its heat in the condenser 4 to the absorption fluid in the desorber 2. The heat required for desorption by generating refrigerant vapor from the absorption fluid in the desorber 2 is thus provided by the heat of condensation of the refrigerant vapor. The condensed refrigerant is guided through the passage 44 to the refrigerant storage space 14 to be stored.

Figure 5:
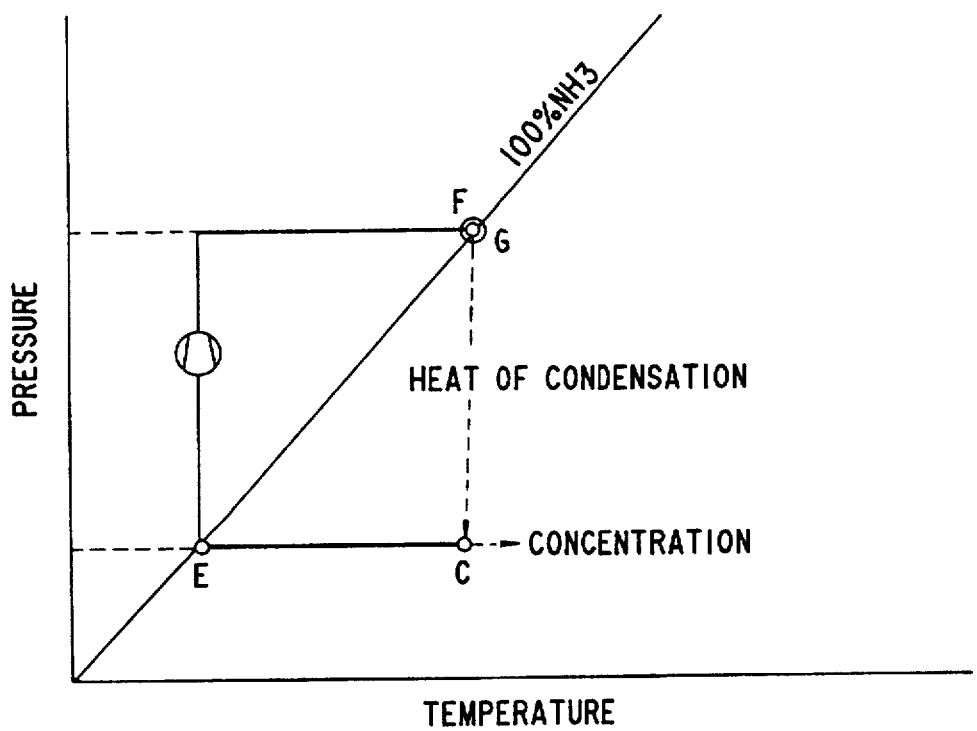
FIG. 5 is a Duhring's diagram showing a solution condensation step of the heat pump device of the second embodiment.

The process to this point will be explained with reference to FIG. 5 which is a Duhring's diagram for the condensation process of the absorption fluid. The fluid in a desorber 2 is in a state C in FIG. 5, from which the refrigerant vapor (state E) is separated by the action of the compressor. The separated refrigerant is compressed (state F), and is delivered to the condenser 4 to be condensed (state G). The heat of condensation is used to heat the fluid in state C in the desorber 2 which is used for performing the desorption process. Because the refrigerant is separated from the absorption fluid and is stored, the absorbent concentration becomes high. As absorbent concentration of the fluid increases and when a suitable concentration is reached, the passage 43 side of the three-way valve 53 is closed, and the passage 42 is opened to circulate the chilled water, thus resuming the normal mode of operation.

Next, the steps for adjusting absorbent concentration of the fluid for the heat pump device shown in FIG. 4 when the concentration is too high will be explained along with the resulting effect of such adjustments. In this type of operation method, the whole system is operated at a relatively low pressure, and the system is vulnerable to insufficient cooling and shut-down due to low pressure effect in the compressor. In this mode of operation, the compressor 7 and the fluid pump 6 are operated, and the passage 42 side of the three-way valve 53 is closed and the passages 41, 43 are operated. The valve 52 provided in the passage 45 is temporarily opened so that the refrigerant in the refrigerant storage space 14 will flow into the absorption fluid present in the absorption fluid passage 22 by the discharge pressure of the compressor. This process dilutes the absorption fluid and weakens the absorbent concentration. When absorbent concentration is diminished to reach a suitable strength, the valve 52 is closed, and the passage 43 side of the three-way valve 53 is closed to return to the normal mode of operation.

Accordingly, in addition to the normal cooling operation in combination with the desiccant assisted air conditioning section, the system enables selective operation of either concentrating or weakening the absorption fluid by selectively storing or releasing the refrigerant in or from the storage space, thus providing a system capable of operating at a stable pressure with increased reliability.

Figure 6:
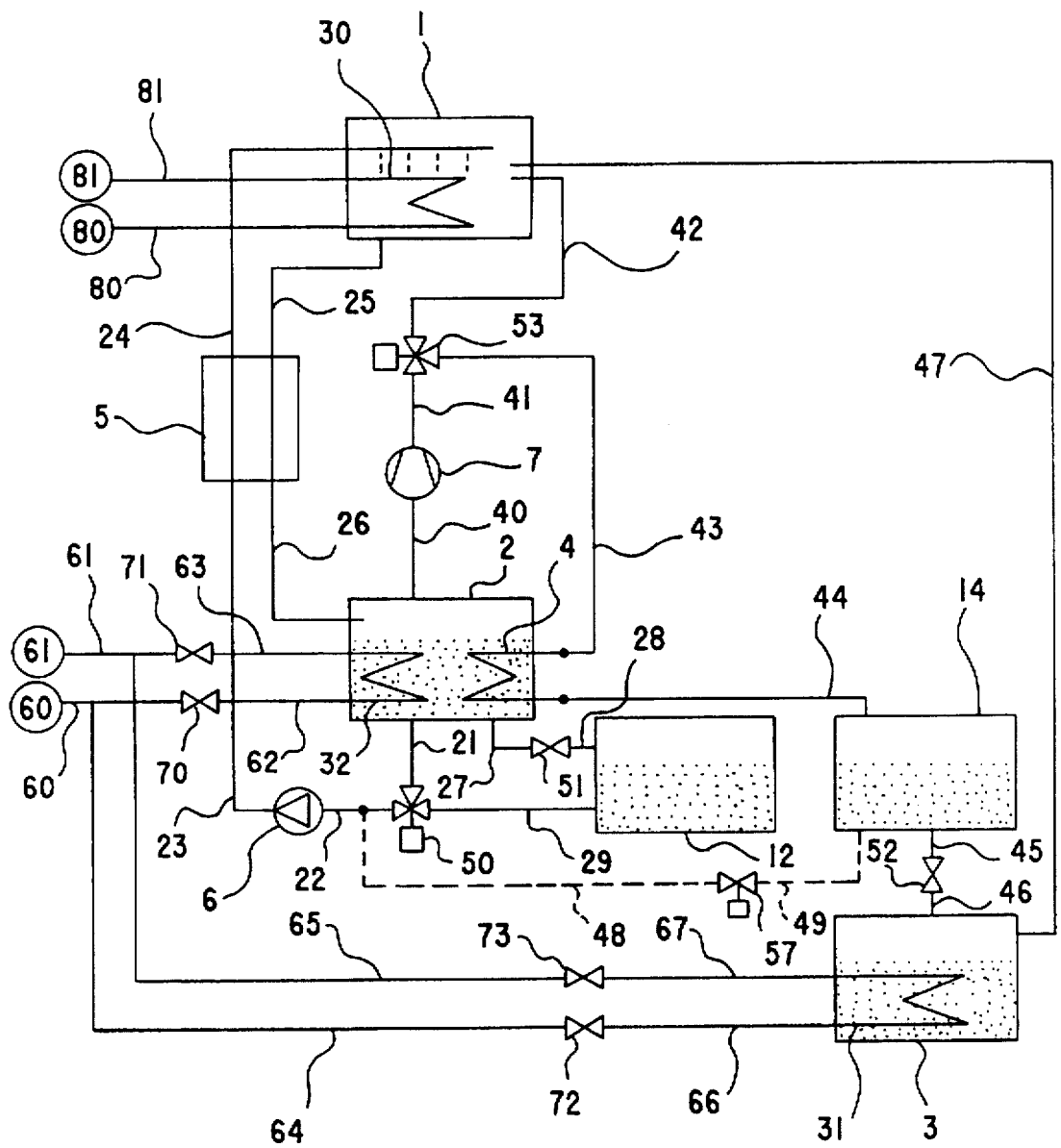
FIG. 6 is a schematic representation of a heat pump device of a third embodiment of the present invention.

A third embodiment of the desiccant assisted air conditioning system is shown in FIG. 6. The system is provided with an evaporator 3 to admit and evaporate the refrigerant stored in the storage space 14, and a passage 47 for guiding the refrigerant vapor generated in the evaporator 3 to the absorber 1. In parallel with the cooling medium passages 62, 63 for extracting the cooling effect produced by the desorber 2 through the heat transfer tube 32, cooling medium passages 64, 65 are provided to exchange heat with the evaporator 3 through the heat transfer tube 31. Also, the cooling medium passages 62, 63, on the one hand, and 66, 67 on the other are provided with a respective shutoff valves 70, 71, 72 and 73 so that the cooling medium can be selectively directed to either the desorber 2 or the evaporator 3.

Further, the system is provided with a first passage 43 branching from the refrigerant passage 41 for guiding the refrigerant vapor compressed in the compressor 7 by way of the three-way valve 53, a second passage 42 branching from the refrigerant passage 41 for guiding the refrigerant vapor to the absorber 1, and a passage 44 for guiding the refrigerant condensed in the condenser 4 to the storage space 14. The refrigerant storage space 14 is communicated with the evaporator 3 through the passages 45, a valve 52, and a passage 46. The system is further provided with an absorption fluid storage space 12 to store the strong fluid, which is communicated with the desorber 2 through the passage 27, shutoff valve 51 and the passage 28. The absorption fluid storage space 12 is further communicated with the absorption fluid circulation passage 21 and the passage 29 through the three-way valve 50, and the refrigerant vapor space of the evaporator 3 is communicated with the absorber 1 through the passage 47.

In the system of the configuration presented above, the cooling medium (chilled water) and the heating medium (hot water) are circulated through the desiccant assisted air conditioning system shown in FIG. 2, through the respective cooling medium inlet/outlet 60, 61 and the heating medium inlet/outlet 80, 81.

The operation of the system will be explained next.

Figure 7:
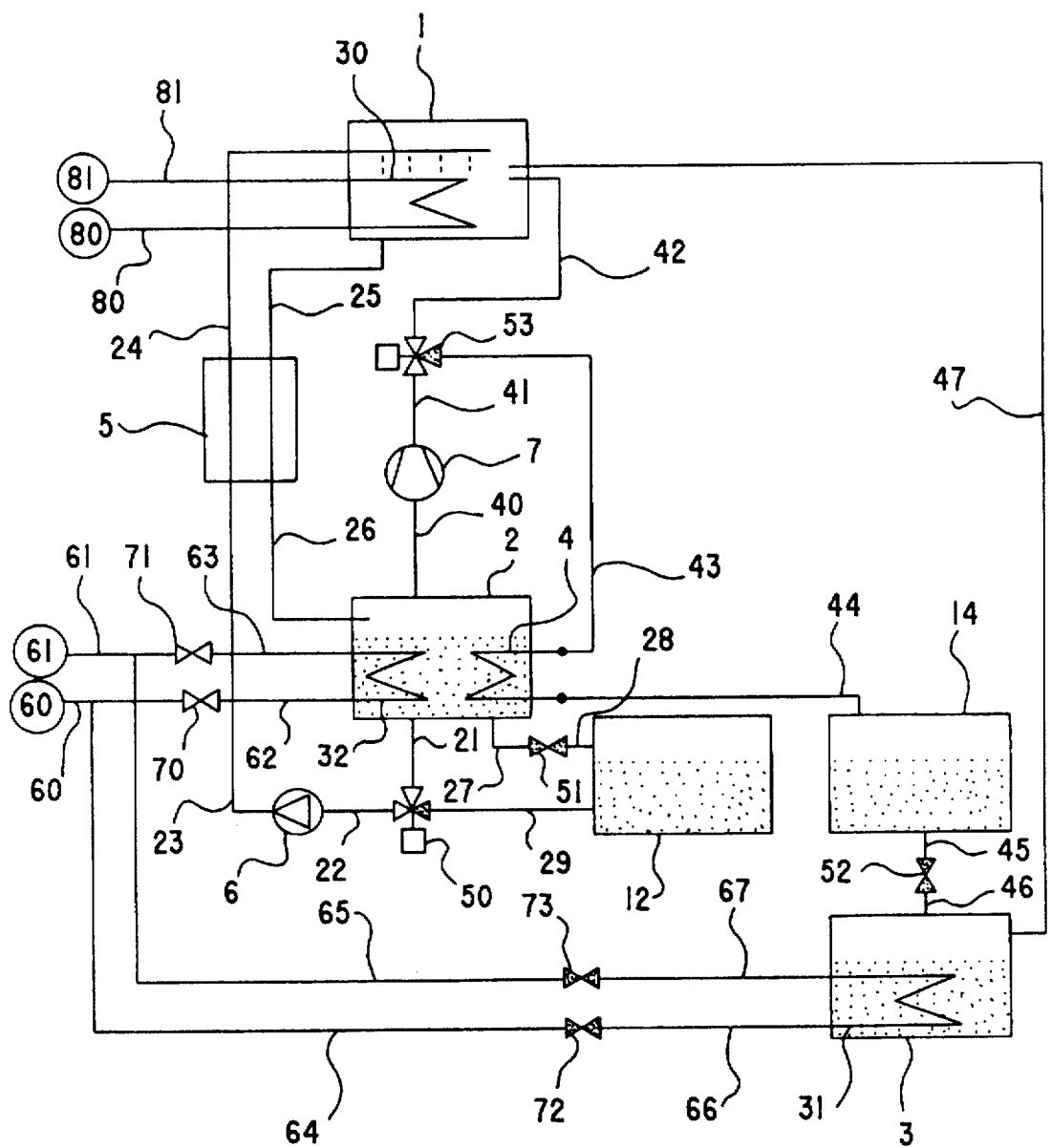
FIG. 7 is a schematic representation showing an operation mode of a heat pump device of FIG. 6.

First, the normal mode of the operation will be explained. In this case, the heat pump device is arranged as shown in FIG. 7. In FIG. 7, the passage 43 side of the three-way valve 53 is closed and the passages 41 and 42 are opened. The shutoff valve 51 is closed, and the fluid storage space 12 and the desorber 2 are not communicated. The valve 52 is closed, and the refrigerant storage space 14 and the evaporator 3 are not communicated. The shutoff valves 72, 73 are closed and the chilled water is not flowing in the evaporator 3. The three-way valve 50 is closed to the direction of passage 29 side, and the fluid storage space 12 and the absorption fluid passage 21 for the outlet of the desorber 2 are not communicated. Under these conditions, the operation of the system is exactly the same as the one shown in FIG. 1, and the action of the heat pump device and the air conditioning section can be explained with the Duhring's diagram shown in FIG. 3, and the explanations will be omitted.

Figure 8:
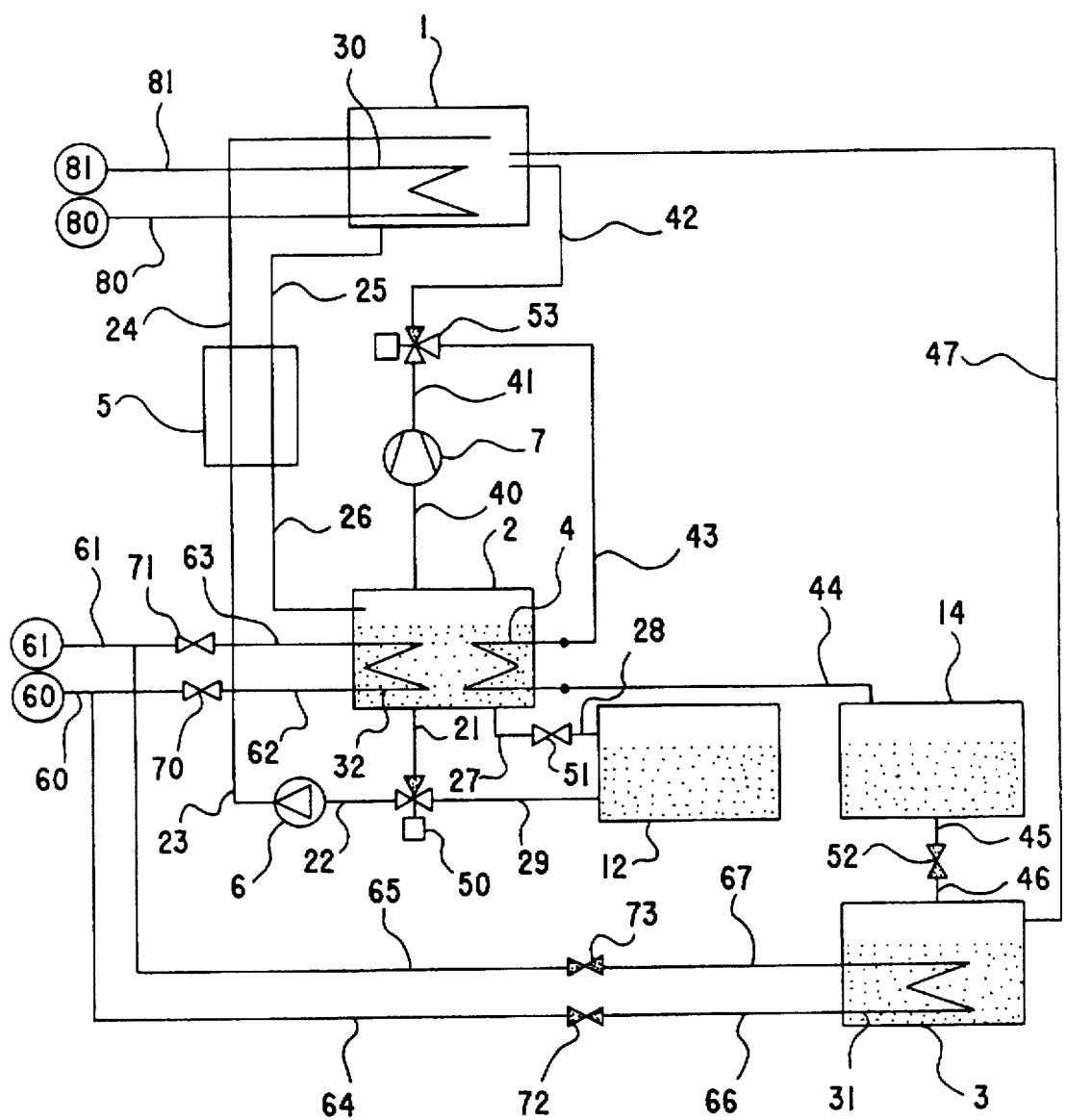
FIG. 8 is a schematic representation showing another operation mode of a heat pump device of FIG. 6.

The heat accumulation operation mode of the heat pump device shown in FIG. 6 will be explained. This operation mode is designed to be adopted during the summer period to save an energy cost by using midnight rate of electrical power for storage of cooling capacity so that the daytime cooling operation can be carried out without resorting to the use of the compressor. In this case, the heat pump device should be arranged as shown in FIG. 8. In FIG. 8, the three-way valve 53 is closed to the direction of passage 42, and the passages 41 and 43 are operated. The shutoff valve 51 is opened, and the fluid storage space 12 is communicated with the desorber 2. The shutoff valve 52 is closed, and the refrigerant storage space 14 and the evaporator 3 are not communicated. The shutoff valves 72, 73 are closed, and the chilled water is not flowing through the evaporator 3. The three-way valve 50 is closed in the direction of the passage 21, and the desorber 2 and the absorption fluid passage 22 are not communicated. The chilled water is stopped by closing valves 70 and 71, and the compressor 7 and the fluid pump 6 are operated. In the air conditioning section of the system, the hot water pump 150 and the blower 140 in FIG. 2 are operated.

The operation of the heat pump device of such a configuration will be explained. In FIG. 8, because the absorber 1 does not receive the refrigerant compressed by compressor 7, the absorption effect is stopped. On the other hand, the compressor 7 is operated, and the refrigerant vapor is generated from the absorption fluid in the desorber 2, and the refrigerant is compressed and flows into the passages 41, 43 to flow into the condenser 4 for heat exchange with the desorber 2. The refrigerant is condensed by releasing the heat to the absorption fluid in the desorber 2. As described here, the heat of desorption during the refrigerant generation process in the desorber 2 is covered by the heat of condensation of refrigerant vapor, but the condensation heat is generally greater than the desorption heat because of the added heat from the compressor, therefore, the absorption fluid temperature in the desorber 2 tends to increase.

However, because the absorption fluid in the desorber 2 is circulated by the pump 6 and is cooled by heat exchange with the heating medium (hot water) in the absorber 1 and is returned to the desorber 2, abnormal temperature rise of the absorption fluid in the desorber 2 is prevented. Also, the temperature of the hot water itself rises through the interaction with the absorption fluid, but the temperature is lowered by the action of the blower in bringing the outdoor air and through the hot water heat exchanger (heater) 120, and the heat is discharged to outside. In this case, the desiccant wheel 103 is regenerated by the outside air having risen in temperature and a low relative humidity. The condensed refrigerant is led to the refrigerant storage space 14 through the passage 44. The concentrated absorption fluid after releasing the refrigerant vapor returns to the absorption fluid passage 22 through the passage 27, shutoff vale 51, passage 28, the fluid storage space 12 and the passage 29 to complete the circulation passage.

Figure 11:
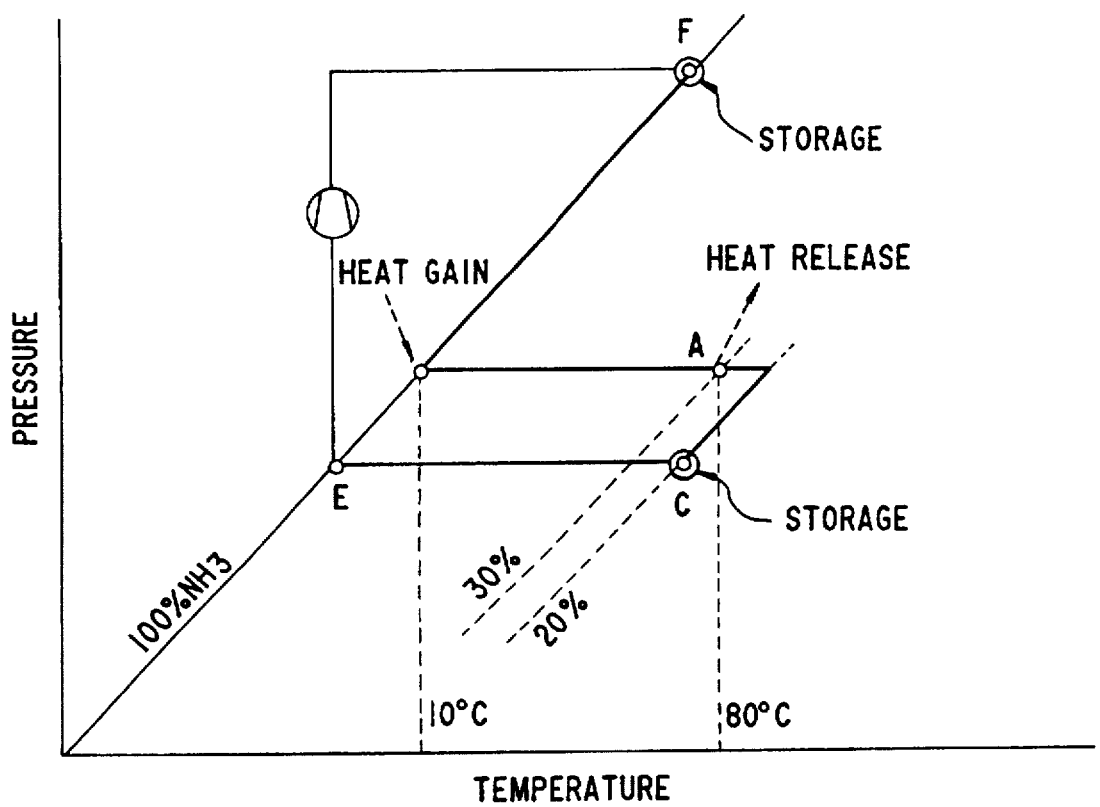
FIG. 11 is a Duhring's diagram showing operation cycles in the operation mode of FIG. 10 for a heat pump device of FIG. 6.

In this operational mode, the strengthening of the absorption fluid is progressed until a sufficient quantity of the refrigerant becomes stored in the refrigerant storage space 14 (in this embodiment, when the concentration of the absorption fluid becomes about 20% as shown in FIG. 11), and then the operation of the heat pump device is stopped. The system is now in the heat accumulation maintaining mode. In this mode, the three-way valve 50 is closed to the previously open passage 29, and the passages 21, 22 are opened, and the shutoff valve 51 is closed, the three-way valve 53 is now closed to the previously open passage 43, and the passages 41 42 are opened. In this configuration, the concentrated absorption fluid and the refrigerant are respectively stored in the fluid storage space 12 and the refrigerant storage space 14.

Figure 9:
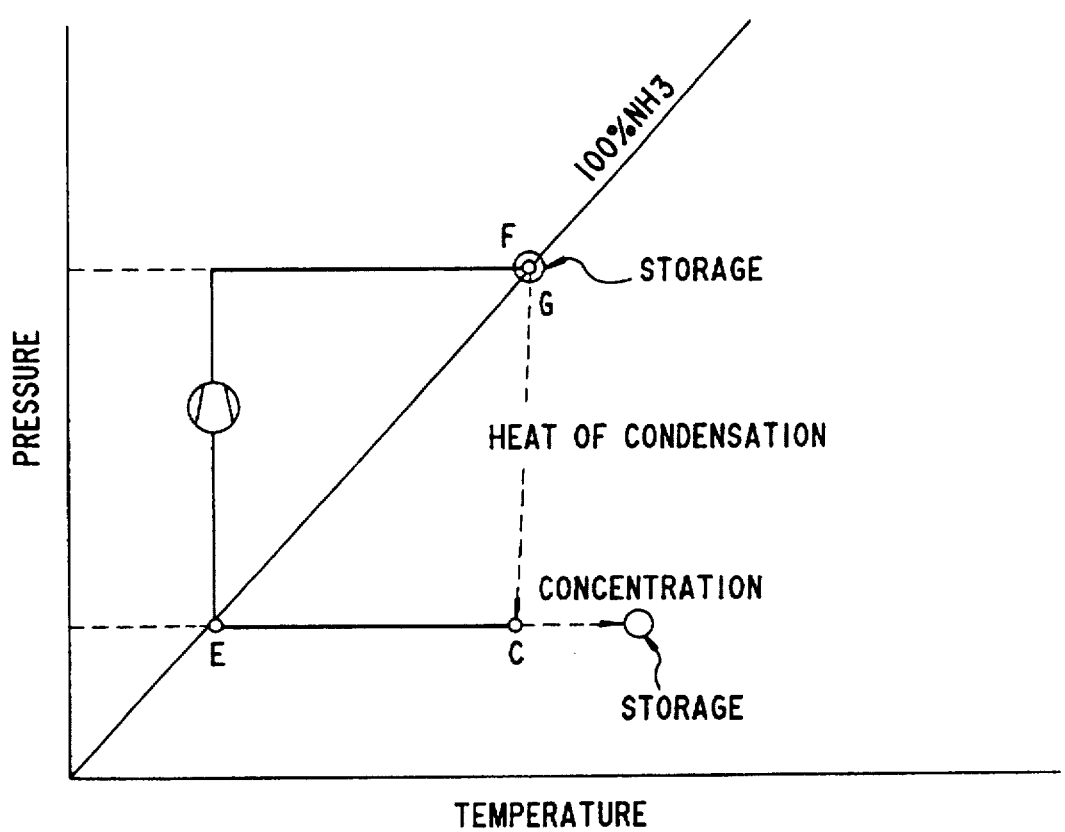
FIG. 9 is a Duhring's diagram showing operation cycles in the operation mode of FIG. 8 for a heat pump device of FIG. 6.

The process of heat accumulation by concentrating the working fluid will be explained with reference to FIG. 9 which is a Duhring's diagram showing the process of increasing concentration of the absorption fluid. The fluid in FIG. 9 starts off in a state C as is in the desorber 2, and the refrigerant vapor (state E) is separated by the action of the compressor. The separated refrigerant is compressed (state F), and is delivered to the condenser 4 to be condensed (state G). The heat of condensation is used to heat the fluid in state C in the desorber 2 to perform the desorption process. In this heat accumulation mode, chilled water (cooling medium) is not produced, and heat is discharged through hot water to outside. Therefore, there is no cooling effect, and explanations regarding the operation of the air conditioning section will be omitted. The heat accumulation effect by separating the refrigerant from the absorption fluid in the form of chemical potential will be explained in more detail in the following.

Cooling operation of the heat pump device shown in FIG. 6, without using the compressor, by releasing the heat accumulation in the form of chemical potential is explained as follows. As mentioned earlier, this type of operation is useful during the summer period to decrease peak-demand for electricity so that cooling may be carried out without operating the compressor. The heat pump is arranged as shown in FIG. 10.

Figure 10:
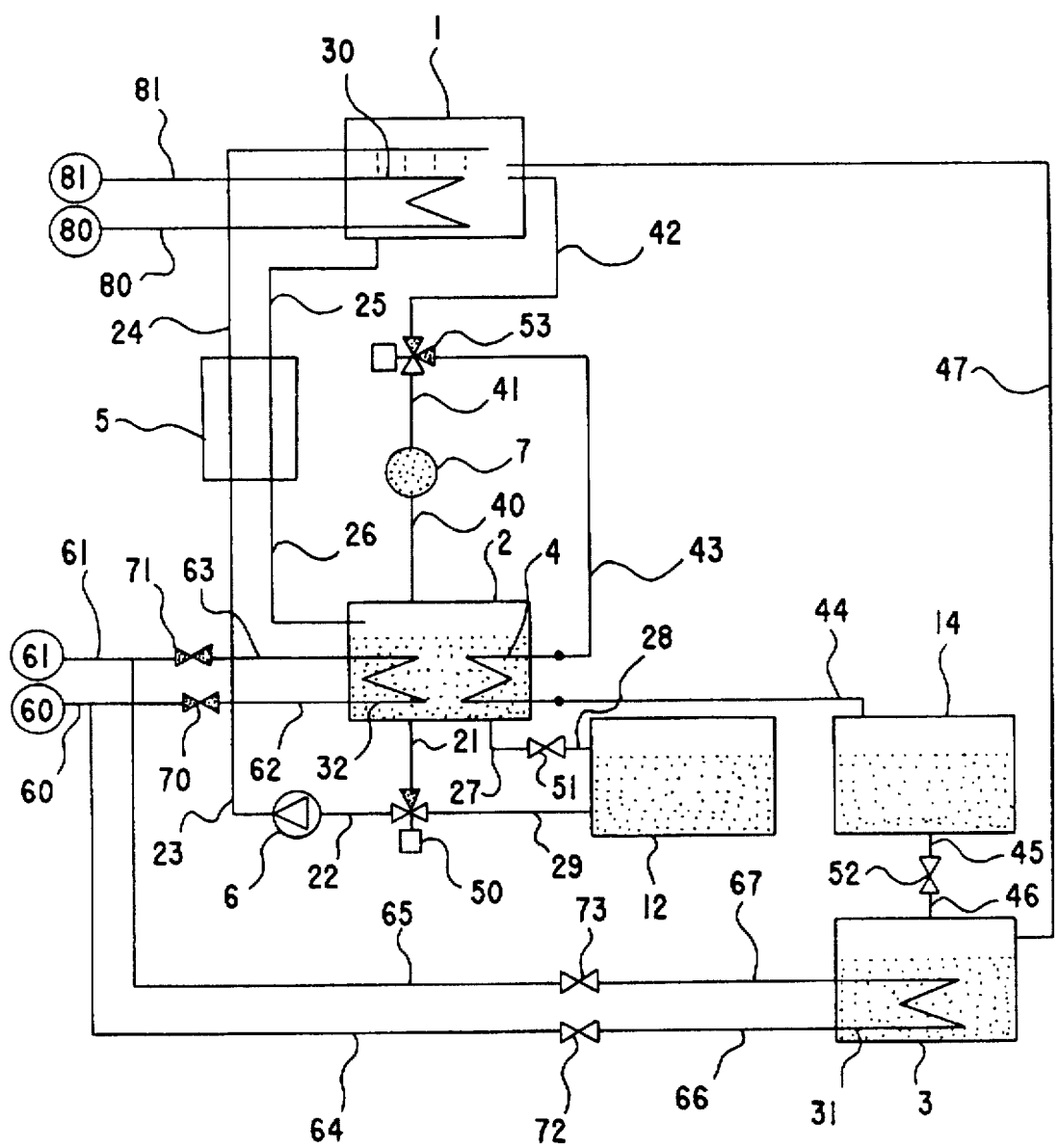
FIG. 10 is a schematic representation showing another operation mode of a heat pump device of FIG. 6.

In FIG. 10, the three-way valve 53 is closed in the directions of passages 42, 43 and the passage 41 is not communicated with either passage 42 or 43. The shutoff valve 51 is open, and the fluid storage space 12 and the desorber 2 are communicated. The valve 52 is open, and the refrigerant storage space 14 and the evaporator 3 are communicated. The shutoff valves 72, 73 are open, and the chilled water is flowing through the evaporator 3. The shutoff valves 70, 71 are closed, and the chilled water is not flowing in the desorber 2. The three-way valve 50 is closed in the direction of the passage 21, and the absorption fluid passage 22 and the absorption fluid passage 21 at the outlet of the desorber 2 are not communicated. The fluid pump 6 is operated. The result of this heat pump arrangement is that the refrigerant is evaporated in the evaporator 3 by the absorption action of the absorber 1, and obtains heat of evaporation from the cooling medium (chilled water) through the heat transfer tube 31. In FIG. 10, evaporation takes place at 10° C. to cool the cooling medium. The evaporated refrigerant flows into the absorber 1 through the passage 47.

In the meantime, the absorption fluid, having been concentrated and storing sufficient absorption capacity during the heat accumulation operation mode, exits the fluid storage space 12 and is withdrawn by the pump 6 through the passages 29, 22 and is pressurized. The pressurized fluid passes through the passage 23 and performs heat exchange with the returning absorption fluid from the absorber 1 in the heat exchanger 5, and then enters the absorber 1 through the passage 24. In the absorber 1, it absorbs refrigerant vapor (ammonia) from the evaporator 3, resulting in that the absorption fluid becomes diluted or weak (and the refrigerant becomes concentrated). The heat of absorption is released to the heating medium (water) through the heat transfer tube 30. In FIG. 10, absorption occurs at 80° C. to heat the heating medium. After exiting the absorber 1, the absorption fluid reaches the heat exchanger 5 through the passage 25, and exchanges heat with the concentrated absorption fluid from the fluid storage space 12 to reach the desorber 2 through the passage 26, and further through the passage 27, shutoff valve 51 and the passage 28 to return to the fluid storage space 12. In the fluid storage space 12, the concentration of the absorption fluid becomes gradually weak due to the diluted returning fluid from the absorber 1, but until the absorption fluid reaches a refrigerant concentration of about 30%, it is possible to maintain the evaporation temperature and the absorption temperature mentioned above.

The steps to this point will be explained with reference to FIG. 11. FIG. 11 is a Duhring's diagram of the cycles for the absorption fluid. When the process of heat accumulation mode is completed, the absorption fluid in the desorber 2 is in a state C as explained in connection to FIG. 9, and the refrigerant vapor separated by the action of the compressor (state E) is compressed (state F), and is delivered to the condenser 4 (state G) to be stored. The concentrated absorption fluid in the desorber 2 (state C) is stored in the fluid storage space 12. To perform cooling by discharging the stored heat under these conditions, the absorption fluid is forwarded to the absorber 1 by the action of the pump 6, and after absorbing the refrigerant evaporated in the evaporator 3 (at 10° C. in the embodiment as shown in the Figure) to become diluted (state A: at 80° C. in the Figure) and returns to the fluid storage space 12 to become mixed with the stored fluid in the fluid storage space 12. The operation is continued until the overall capacity for absorption is diminished by dilution, and without operating the compressor, to produce hot and chilled water simultaneously. The system is thus able to produce both hot and chilled water to provide two heat accumulation effects of cooling as well as heating. The operation of the air conditioning section of the system is the same as the normal operation of the system shown in FIG. 7, and the explanations will be omitted.

Accordingly, by operating the compressor during the night time to separate the refrigerant and storing the heat in the form of chemical potential, the system is able enables to produce both chilled and hot water, during the daytime without operating the compressor. In other words, the heat pump device of the present invention is able to provide both cooling and heating effects through discharging of the stored heat, by storing absorption fluid of high concentration produced in the desorber by operating the compressor, storing the refrigerant condensed in the condenser to perform heat accumulation, forwarding the stored absorption fluid to the absorber, and by sending the refrigerant to the evaporator.

In the explanation of the present invention, to clarify the functions of each component in the system, the evaporator 3 and the refrigerant storage space 14 were used separately, however, it is permissible to integrate the two functions by providing a storage function in the evaporator 3, and in such a case, the same effect can be produced by providing the shutoff valve 52 in FIG. 6 in either the passages 44 or 43, and providing a new shutoff valve in the passage 47.

Also, in the explanation of the present invention, to clarify the functions of each component in the system, the desorber 2 and the fluid storage space 12 were used separately, however, it is permissible to integrate the two functions by providing a storage function in the desorber 2, and in such a case, the normal mode of operation by operating the compressor under stored heat cannot be performed, but after storing the heat, cooling can be performed independently.

There may be a case when it is preferable to provide a concentration difference of fluid even when the normal mode of operation is performed to obtain chilled and hot water of the same temperature, for example, between an operation shown in FIG. 7 (with Duhring's diagram shown in FIG. 3) and in FIGS. 10 (with Duhring's diagram shown in FIG. 11). That is, in FIG. 10 with no compressor, the proper refrigerant concentration of the absorption fluid is 20~30%, while in FIG. 7, with compressor operating, the proper refrigerant concentration is 50~60%.

Figure 12:
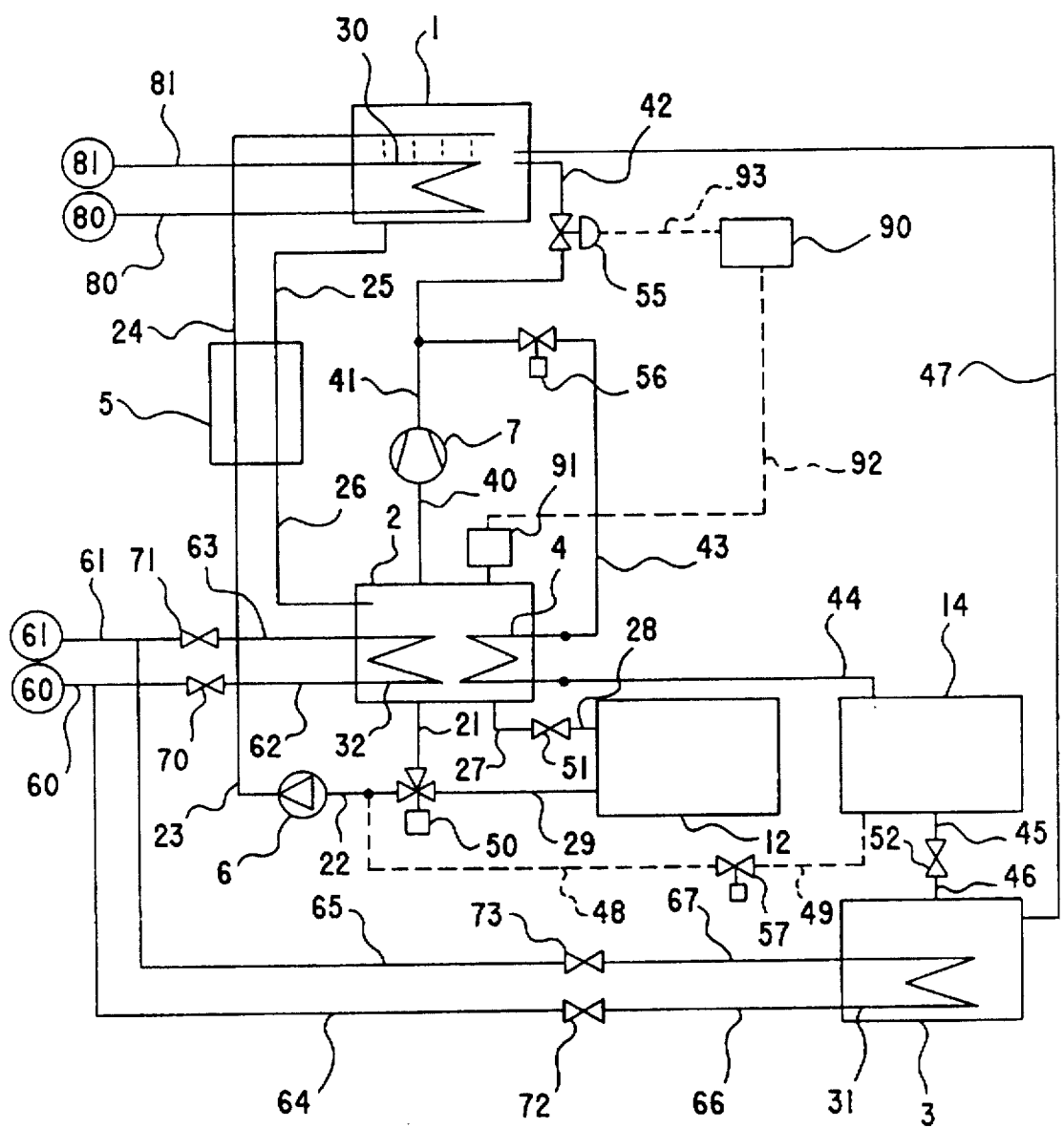
FIG. 12 is a schematic representation of a heat pump device of a fourth embodiment of the present invention.

If the refrigerant concentration is chosen to be 20~30% in FIG. 7, the whole cycle in FIG. 3 shifts to the low pressure side, and the suction specific volume for the compressor increases, and the refrigerant mass flow rate of the compressor is lowered, and the cooling capacity is also decreased. Therefore, in the case of operation in FIG. 7, it is preferable to increase the refrigerant concentration, i.e. to dilute the absorption fluid. To perform the dilution step while maintaining the heat accumulation, the fluid storage space 12 is sealed off by operating the shutoff valve 51 and the three-way valve 50, and provide a valve 57 as shown in FIG. 12 to communicate the refrigerant storage space 14 and the absorption fluid passage 22 through the valve 57 and the refrigerant passages 48, 49 shown by the dotted line, so that the valve 57 can be opened temporarily to pass the refrigerant through the refrigerant passages 48, 49 to flow the fluid into the passage 22 of the absorption fluid circuit. By this arrangement, it is possible to dilute the absorption fluid in the main cycle without diluting the stored absorption fluid of high concentration.

Accordingly, the heat pump device of the present invention enables lowering of the operating pressure as production of well as cooling and heating effects by heat accumulation so that both cooling and heating effects can be provided for the desiccant assisted air conditioning system.

A fourth embodiment is presented in FIG. 12. The points of difference between this embodiment and the one shown in FIG. 6 are the following.

Both systems are provided with an absorber 1, a desorber 2, a compressor 7, an evaporator 3 and a condenser 4, but instead of using the three-way valve 53 for branching the refrigerant passage 41 from the compressor 7 towards the condenser 4 and the absorber 1, in the present embodiment, a shutoff valve 56 is provided in the first passage 43 and an adjusting valve 55 in the second passage 42. By this arrangement, it is possible to independently adjust the opening of both valves 55, 56. Further, a pressure sensor 91 is provided in the desorber, and a controller 90 is provided so that the output signal from the pressure sensor 91 is used to control the opening of the adjusting valve 55 to maintain the pressure in the desorber 2 at a pre-determined value.

The heat pump device shown in FIG. 12 circulates cooling medium (chilled water) and heating medium (hot water) through the respective inlet/outlet 60, 61 of the cooling medium passage and the inlet/outlet 80, 81 of the heating medium passage which are connected to those of the desiccant assisted air conditioning system shown in FIG. 2.

Figure 13:
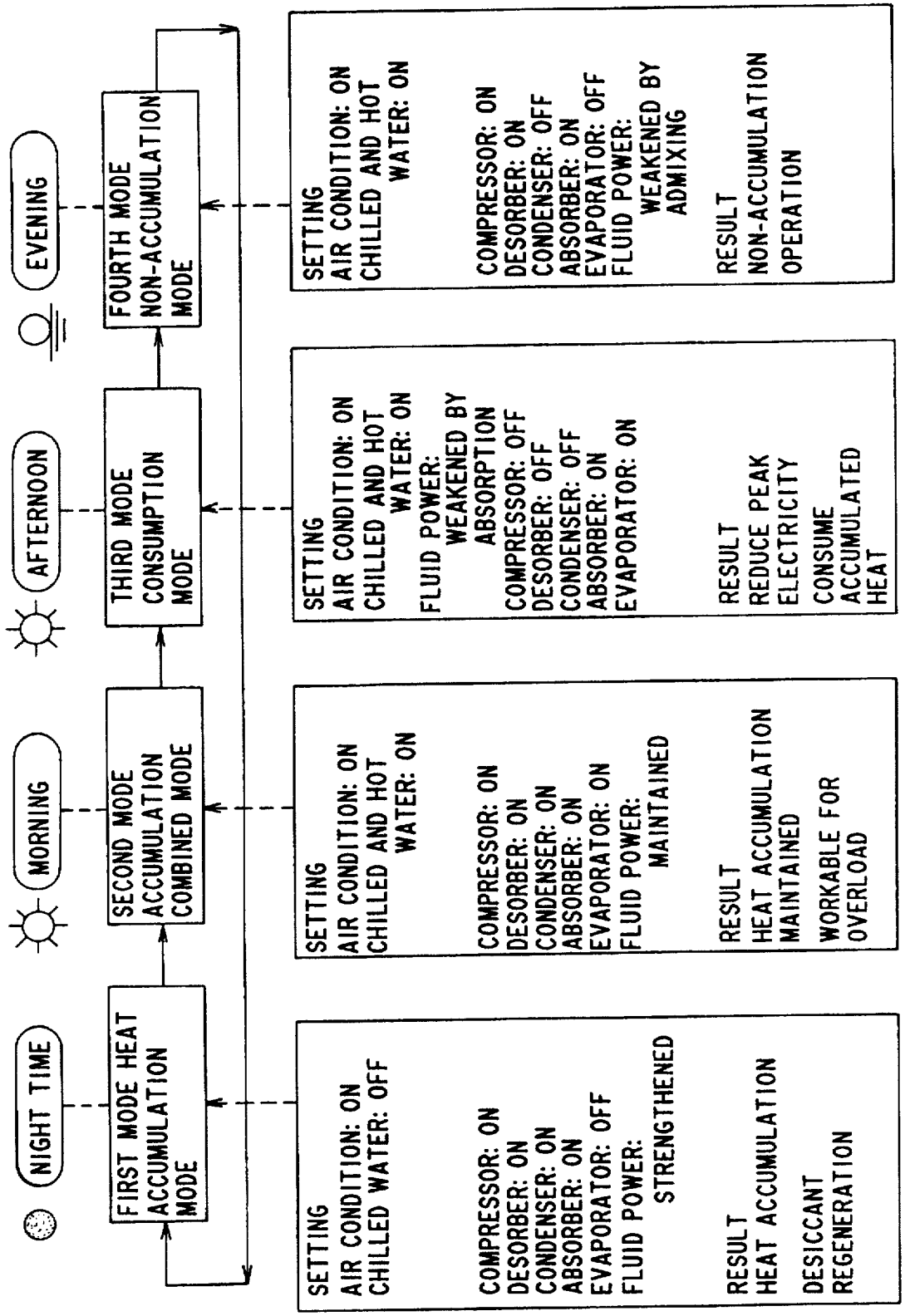
FIG. 13 is a schematic representation showing various operation modes of the heat pump device of FIG. 12.

In this embodiment, it is possible to selectively switch between the four modes of operation shown in FIG. 13. More specifically, in the first operational mode, the compressor 7 is operated so that the refrigerant vapor in the desorber 2 can be compressed and condensed in the condenser 4 so that the absorption fluid is concentrated by storing the condensed fluid in the fluid storage space 12 and the condensed refrigerant in the refrigerant storage space 14.

In the second operational mode, the compressor is operated to compress the refrigerant vapor from the desorber and the refrigerant is condensed in the condenser to concentrate the absorption fluid in the desorber to increase concentration of the absorption fluid in the desorber, and the refrigerant is evaporated in the evaporator to be absorbed in the absorber.

In the third operational mode, the compressor is stopped, and the refrigerant is evaporated in the evaporator, and the evaporated refrigerant is absorbed by the absorber.

In the fourth operational mode, the compressor is operated to compress the refrigerant vapor from the desorber and the refrigerant is absorbed in the absorber.

These four modes of operation can be selectively switched as described later. The operation of each of the present embodiment will be explained individually in the following. The first operational mode of heat accumulation will be explained first. This type of operation is desirable when heat accumulation is utilized to reduce the daytime power demand by using night time electricity.

Figure 14:
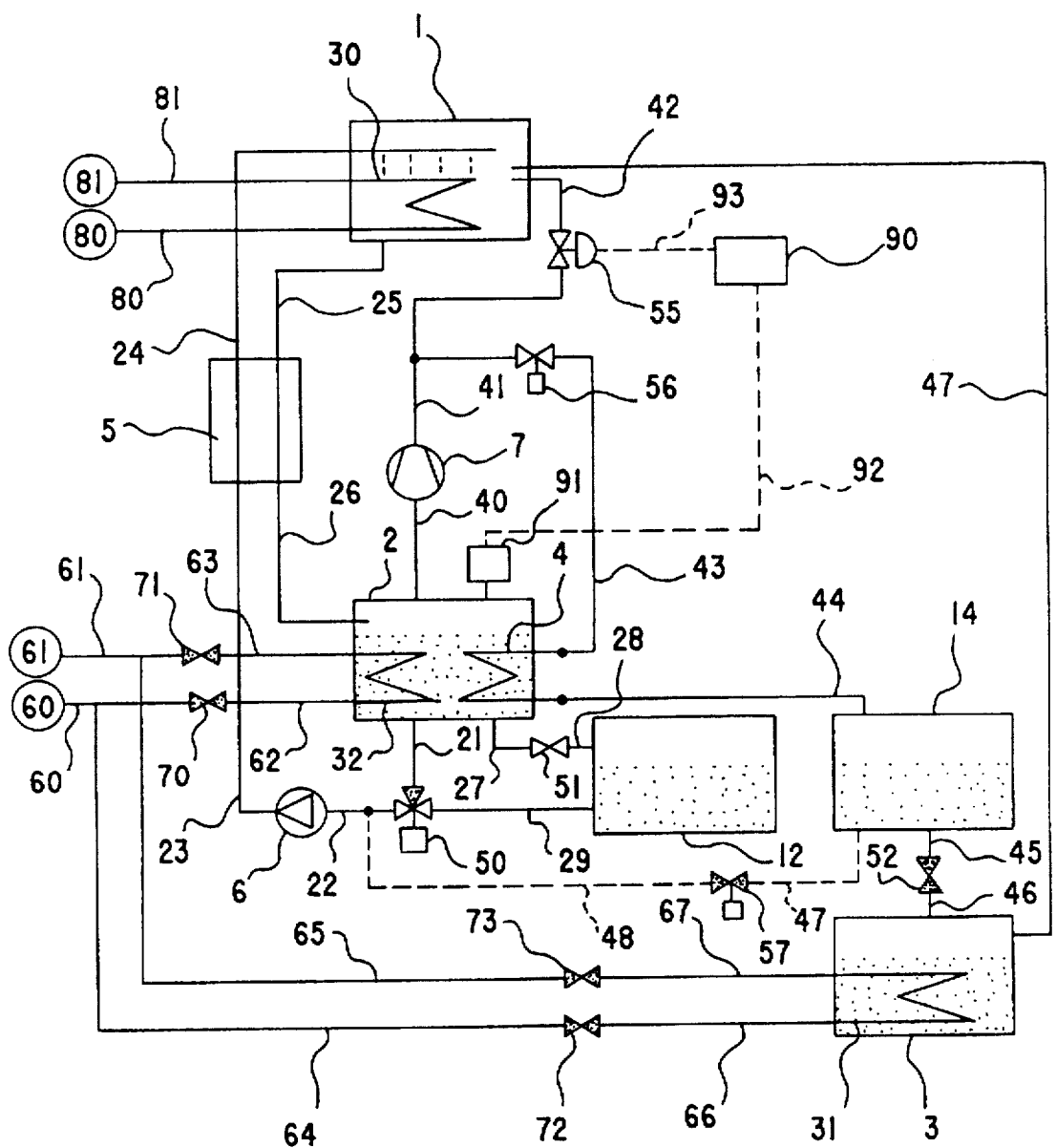
FIG. 14 is a schematic representation showing a first operation mode of a heat pump device of FIG. 12.

In the first operational mode, the heat pump device is arranged as shown in FIG. 14. In FIG. 14, the shutoff valve 56 is open, and the passages 41 and 43 are communicated. Adjusting valve 55 is closed while the system is not activated, and after the system is operating the opening is controlled by the controller 90 so as to maintain constant pressure inside the desorber 2. The shutoff valve 51 is open, and the fluid storage 12 and the desorber 2 are communicated. The valve 52 is closed, and the refrigerant storage space 14 and the evaporator 3 are not communicated. The shutoff valves 72, 73 are closed, and the evaporator 3 has no chilled water circulated therein. The shutoff valves 70, 71 are closed, and the desorber 2 has no chilled water circulated therein. The three-way valve 50 is closed in the direction of passage 21, and the desorber 2 and the absorption fluid passage 22 are not communicated directly.

In the air conditioning section, the blower 102 in FIG. 2 is stopped, and air supply to the conditioning space is stopped. The blower 140 is operated to regenerate the desiccant. Chilled water circuit is closed, and only hot water circuit is operated. The compressor 7 and the fluid pump 6 in the heat pump device are operated.

The operation of the heat pump having the configuration described above will be explained. In FIG. 14, when the compressor 7 is activated, refrigerant vapor is generated from the absorption fluid in the desorber 2, and the vapor is compressed, and the compressed vapor flows into the condenser 4 heat-exchangeable with the desorber 2. The refrigerant vapor is condensed in the condenser 4 by releasing heat to the absorption fluid in the desorber 2. The heat of desorption in the desorber 2 for generating the refrigerant from the absorption fluid is covered by the heat of condensation of the refrigerant, but the heat of condensation is generally larger than the desorption heat because of the input of compressor heat, therefore, the temperature and pressure in the absorption fluid in the desorber 2 show a tendency to increase. If the pressure of the absorption fluid in the desorber 2 rises, the pressure sensor 91 detects this event, and the controller 90 opens the adjusting valve 55 so that excess vapor can be forwarded to the absorber 1 to be absorbed. If the pressure of the absorption fluid inside the desorber 2 drops, the adjusting valve 55 is closed, and constricts the amount of vapor delivered to the absorber 1 to retain the refrigerant vapor in the desorber 2, thereby maintaining the pressure in the desorber 2 at a constant value.

The refrigerant vapor delivered to the absorber 1 is absorbed in the absorption fluid, and the heat of absorption is removed by heat exchange between the absorption fluid and the heating medium (hot water) through the heat transfer tube 30. At this time, the temperature of the hot water rises by being heated by the effect of the absorption fluid, but this heat is removed by heat exchange in the hot water heat exchanger 120 and outside air brought in by the action of the blower 140 shown in FIG. 2. The temperature of the regeneration air before desiccant wheel 103 rises, and the desiccant material is regenerated by the regeneration air having an elevated temperature and a lower relative humidity. The condensed refrigerant is led to the refrigerant storage space 14 through the passage 44 and stored therein.

The absorption fluid, after being concentrated in the desorber 2, flows into the fluid pump 6 through the passage 27, shutoff valve 51, passage 28, the fluid storage space 12, passage 29 and the absorption fluid passage 22. The pump 6 then forwards the fluid to the heat exchanger 5 through the passage 23, and exchanges heat with the returning fluid from the absorber 1, and then through the passage 24, flows into the absorber 1 wherein the fluid absorbs a portion of the fluid from the compressor 7 to be diluted slightly, and then through the passage 25 and heat exchanger 5, passage 26 to return to the desorber 2 to complete the circulation passage. Under this type of operation, a portion of the refrigerant is absorbed in the absorber 1 to dilute the absorption fluid, but most of the refrigerant is separated from the absorption fluid to flow into the condenser 4, and as a whole, the absorption fluid becomes more concentrated. When the refrigerant is stored sufficiently in the refrigerant storage space 14, the first operational mode is stopped, and the process is transferred to the second operational mode.

Figure 15:
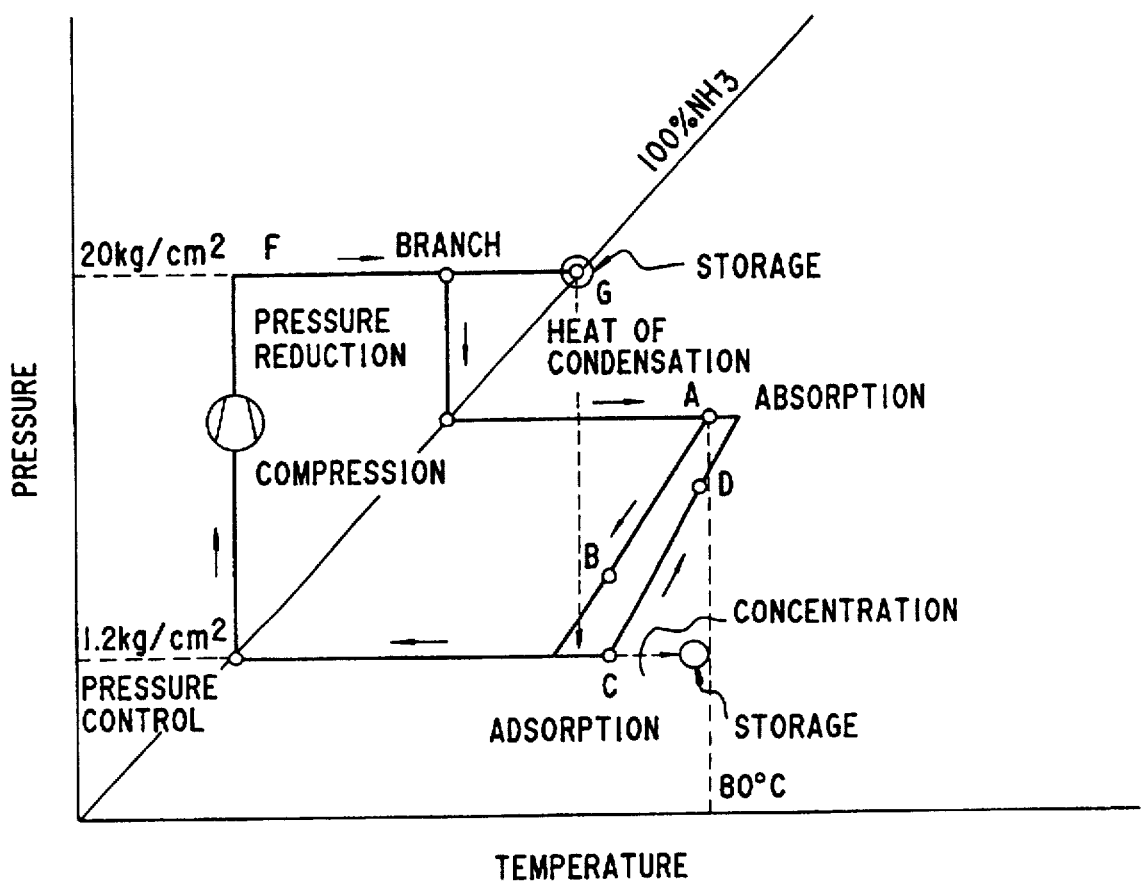
FIG. 15 is a Duhring's diagram showing operation cycles in the operation mode of FIG. 14 for the heat pump device of FIG. 12.

The process of heat accumulation to this point by increasing concentration of the absorption fluid will be explained with reference to FIG. 15. FIG. 15 is a Duhring's diagram for the process steps of increasing concentration of the absorption fluid. In FIG. 15, the absorption fluid in the desorber 2 is in state C, and the refrigerant vapor (state E) is separated by the action of the compressor. The separated vapor is compressed (state F), and most of it is delivered to the condenser 4 to be condensed (state G), and a portion of the remainder is reduced in pressure through the adjusting valve 55 to be delivered to the absorber 1 and is absorbed in the absorbing fluid (state A). The absorbing fluid circulating in the absorbing fluid passage exits from the desorber 2 (state C) and is heated in the heat exchanger 5 (state D), and flows into the absorber 1. The absorption fluid which absorbed the refrigerant vapor in the absorber 1 (state A), is cooled in the heat exchanger 5 (state B) and returns to the desorber 2.

The heat of condensation is used to heat the absorbing fluid in the desorber 2 to supply the heat of desorption. The heat of absorption generated in the absorber 1 is cooled by the hot water (in the figure, 80° C. ) and is routed to the air conditioning section of the system to be utilized for desiccant regeneration. In this mode of operation, chilled water is not produced, but the hot water is produced as described above, for use in heating the regeneration air for desiccant regeneration. The hot water is cooled and returned to the heat pump device. When the first operational mode is completed, condensed refrigerant (state G) and the concentrated absorbing fluid (state C) are stored in the respective storage spaces.

The heat accumulation mode of operation will be explained again later when discussing the third operational mode. In the present embodiment, hot water is used for regeneration of the desiccant material only, but this has been explained previously, and will not be repeated.

As explained above, in the first operational mode, it is possible to simultaneously conduct heat accumulation operation and desiccant regeneration operation while the air conditioning section is inoperative, and this type of operation provides the following advantages. The most favorable time for heat accumulation operation is during summer nights in which a drop in temperature often introduces a rise in relative humidity. When the desiccant material is left exposed to such high humidity during the nighttime, the desiccant material adsorbs moisture from the atmosphere, and when the air conditioning section is first turned on in the morning, there is high probability that cooling capacity has been detrimentally affected during the initial operation. By performing desiccant regeneration simultaneously with heat accumulation operation during the night, a full cooling capacity including dehumidification of the ambient air can be expected to be smoothly provided by the air conditioning section from its initial stage of operation.

In this mode of operation, if the supply of compressed refrigerant vapor from the second passage 42 to the absorber 1 should be stopped, heat input into the heat pump (compressor driving power) is gradually stored, raising the absorption fluid temperature, and ultimately, when the absorption fluid temperature in the absorber 1 becomes higher than the hot water temperature (in the embodiment shown in the drawing, over 80° C.), heat begins to be released to the hot water. At this stage, heat is not removed to an external location, and the absorber temperature and the absorption fluid temperature become nearly equal to each other, and for this reason, the temperature of the desorber 2 increases nearly equal to the hot water temperature. As discussed above, the heat of desorption for the desorber 2 is transmitted from the condenser 4, and the condensation temperature rises higher than the hot water temperature. For desiccant regeneration, it is necessary that the hot water be higher than 60°–80° C., and therefore, approximate condensation temperature rises to about 80° C. The condensation pressure rises to 42 Kg/cm$^2$ at this time, and the compression ratio of the compressor rises abnormally high, leading to excessive wall thickness to make the system withstand impractically high internal pressure. However, as demonstrated in this embodiment, the arrangement of the second passage to guide the refrigerant into the absorber 1 leads to a suppression in the internal pressure to less than 20 Kg/cm$^2$. It is clear therefore that the present invention enables heat accumulation operation to be carried out while preventing the rise of internal pressure of the heat pump device.

Next, the second operational mode will be explained, in which stored heat is maintained while cooling operation is carried out. This mode of operation is designed to be adopted for providing cooling operation during the period after nighttime heat accumulation operation using cheap electricity and prior to a full cooling operation during daytime, by continuing cooling operation with minimal use of the stored heat. Since the usual peak power load for cooling occurs between noon and four p.m., it is advantageous to use the stored heat during the peak demand period. Therefore, the application of the present operational mode during the period up to the peak loading hour develops the overall cooling efficiency.

Figure 16:
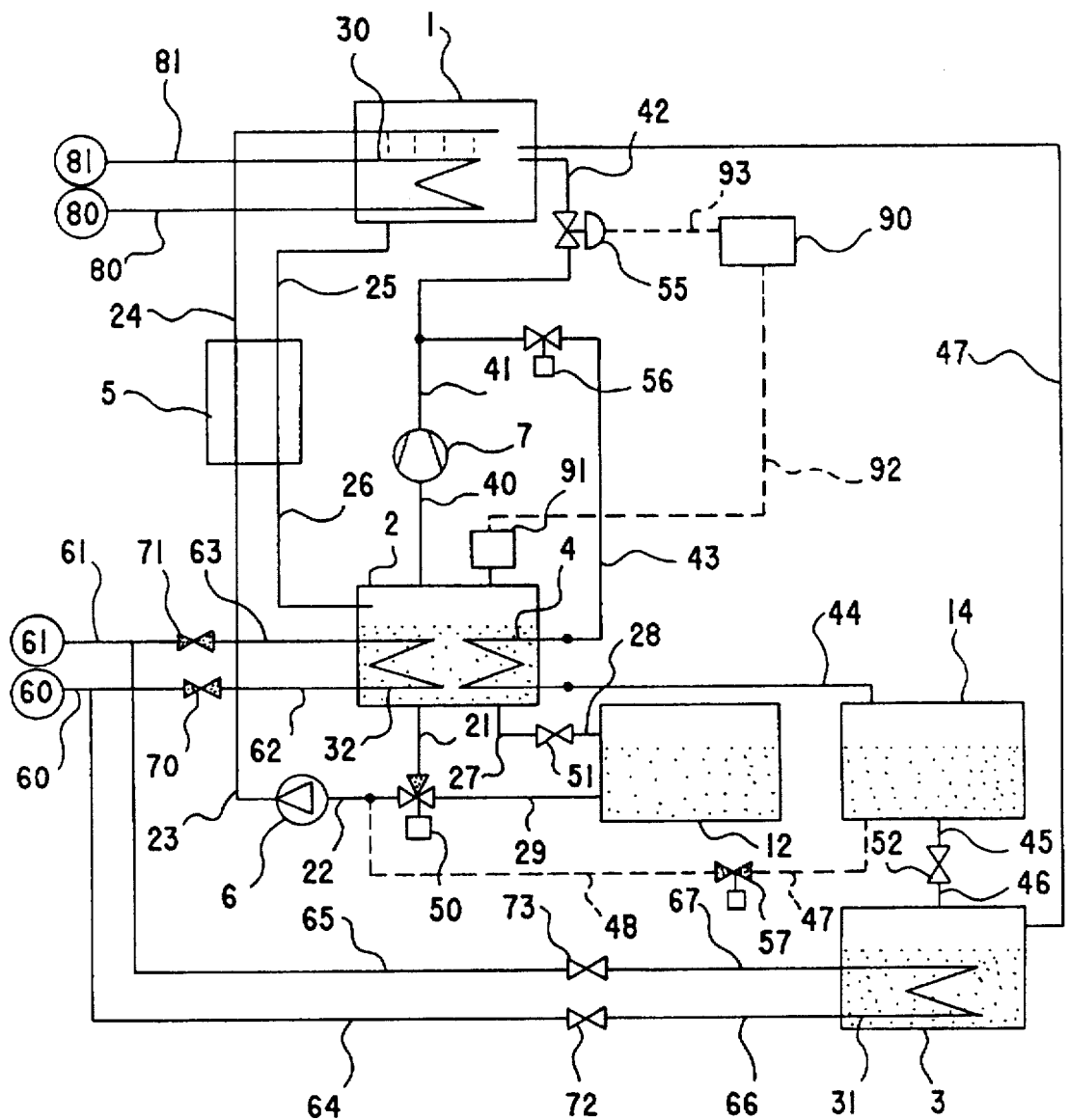
FIG. 16 is a schematic representation showing a second operation mode of the heat pump device of FIG. 12.

In the second operational mode, the heat pump device is arranged as shown in FIG. 16. In FIG. 16, the shutoff valve 56 is open, and the passages 41, 43 are communicated. The adjusting valve 55 is open by the action of the controller 90 so as to maintain the pressure in the desorber 2 constant. The shutoff valve 51 is open, and the fluid storage space 12 and the desorber 2 are communicated. The shutoff valve 52 is open, and the refrigerant is forwarded from the refrigerant storage space 14 to the evaporator 3. Further, the shutoff valves 72, 73 are open, and the chilled water flows through the evaporator 3. The shutoff valves 70, 71 are closed, and the desorber 2 has no chilled water flowing therein. The three-way valve 50 is closed in the direction of the passage 21, and the desorber 2 and the absorption fluid passage 22 are not communicated directly. The compressor 7 in the heat pump device and the fluid pump 6 are operated, and the air conditioning section is operated.

The operation of the heat pump device will be explained next. In FIG. 16, when the compressor 7 is operated, the refrigerant vapor is generated from the absorption fluid in the desorber 2, and the refrigerant vapor is compressed and flows through the passages 41, 43 into the condenser heat-exchangeable with the desorber 2. The refrigerant is condensed in the condenser 4 by releasing heat to the absorption fluid in the desorber 2. The heat of desorption in the desorber 2 for generating the refrigerant from the absorption fluid is covered by the heat of condensation of the refrigerant, but the heat of condensation is generally greater than the desorption heat because of the input of compressor heat, therefore, the temperature and pressure in the absorption fluid in the desorber 2 show a tendency to increase. If the pressure of the absorption fluid in the desorber 2 rises, the pressure sensor 91 detects this event, and the controller 90 opens the adjusting valve 55 so that excess vapor can be forwarded to the absorber 1 to be absorbed. If the pressure of the absorption fluid inside the desorber 2 drops, the adjusting valve 55 is closed, and constricts the amount of vapor delivered to the absorber 1 to retain the refrigerant vapor in the desorber 2, thereby maintaining the pressure in the desorber 2 at a constant value.

In this operational mode, there is another flow of refrigerant. The refrigerant is supplied to the evaporator 3 from the refrigerant storage space 14 (the valve 52 may be provided with flow volume adjusting devices such as thermal expansion valve or float valve), and in the evaporator 3, the refrigerant evaporates by the suction effect of the absorber 1. In this instance, the chilled water is cooled by releasing the heat of evaporation to the refrigerant through the heat transfer tube 31. The refrigerant vapor from the evaporator 3 flows into the absorber 1 through the passage 47 and is absorbed therein. In the absorber 1, the refrigerant vapor from the evaporator 3 through the passage 47, and the refrigerant vapor exiting from the desorber 2, compressed by the compressor 7 and flowing through the passage 42 are absorbed by the absorption fluid, and the heat of absorption is removed by heat exchange between the absorption fluid and the hot water through the heat transfer tube 30. The hot water at this time rises in temperature by cooling of the absorption fluid, and the heat is exchanged with the regeneration air through the hot water heat exchanger 120, and is used to heat the regeneration air.

The refrigerant vapor is compressed by the compressor 7 and is condensed in the condenser 4, and the condensed refrigerant is forwarded to the refrigerant storage space 14. The absorption fluid flows from the desorber 2 through the passage 27, shutoff valve 51, passage 28 and into the fluid storage space 12, then to passage 29 and the absorption fluid passage 22, and flows into the fluid pump 6. The pump 6 delivers the absorption fluid to the heat exchanger 5 through the passage 23 to exchange heat with the absorption fluid returning from the absorber 1 and enters the absorber 1 through the passage 24 to absorb refrigerant from the compressor 7 and the evaporator 3, and the diluted absorption fluid returns to the desorber 2 through the passage 25, heat exchanger 5 and the passage 26 to complete the circulation passage.

Figure 17:
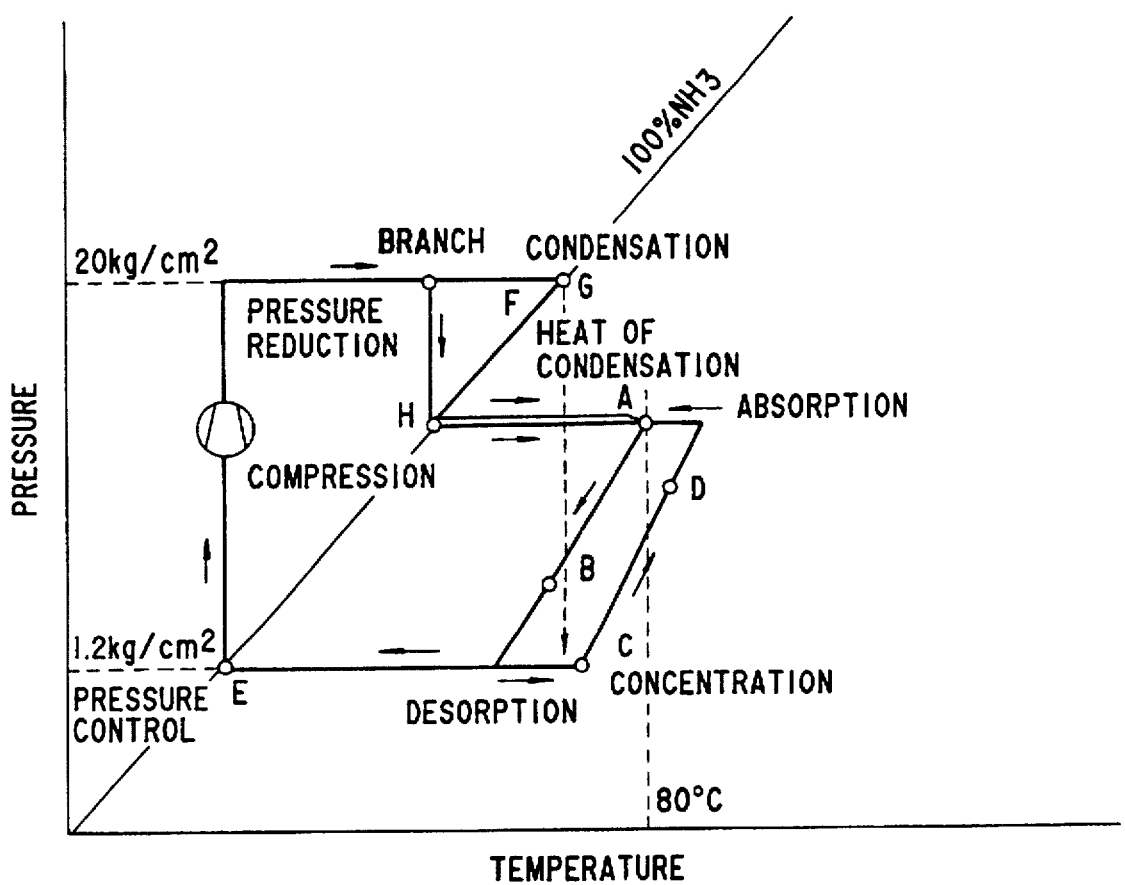
FIG. 17 is a Duhring's diagram showing operation cycles in the operation mode of FIG. 16 for the heat pump device of FIG. 12.

The operation of the heat pump device in the second operational mode will be explained with reference to FIG. 17 which is a Duhring's diagram for the process steps taking place in the heat pump device. In FIG. 17, the absorption fluid in the desorber 2 is in state C, and the refrigerant vapor (state E) is separated by the action of the compressor. The separated vapor is compressed (state F), and most of it is delivered to the condenser 4 to be condensed (state G), and a portion of the remainder is reduced in pressure through the adjusting valve 55 to be delivered to the absorber 1 and is absorbed in the absorbing fluid (state A). The result of the compressor action is the same as the cycle described under the heat accumulation mode of operation, and the absorption fluid becomes concentrated in the desorber 2. Also, in the evaporator 3, the refrigerant is evaporated (state H) by the suction for the refrigerant vapor in the absorber 1.

The evaporated refrigerant flows into the absorber 1 through the passage 47 (state A), where the same process as the known absorption refrigeration cycle takes place, and the absorption fluid is diluted in the absorber 1. In the evaporator, the refrigerant evaporates and cools the chilled water. The chilled water is delivered to the air conditioning section and is used for cooling the process air. The absorption fluid circulating in the absorption fluid passage 22 exits the desorber 2 (state C) , is heated in the heat exchanger 5 (state D), and flows into the absorber 1, and after absorbing both refrigerant vapors from the compressor and from the evaporator (state A), is cooled in the heat exchanger 5 (state B), and returns to the desorber 2. The heat of absorption generated during the absorption process is cooled by the hot water (to 80° C. in FIG. 17), and is transferred to the air conditioning section to be used for regeneration of the desiccant material. As described above, in the second operational mode, the heat pump device performs simultaneously concentrating and diluting of the absorption fluid, as well as cooling of chilled water and heating of hot water.

The chilled water thus produced is used in the air conditioning section of the system shown in FIG. 2 for cooling, however this process has been already described and will not be repeated.

Accordingly, the second operational mode enables simultaneous operations of dilution and concentration of the absorption fluid while conducting air cooling operation, and therefore, it is possible to operate the air conditioning system without diluting the fluid produced in the heat accumulation mode, and allows the use of the cooling capacity of the system while preserving the stored heat. Also, in the second operational mode, because a quantity of absorption fluid having sufficient absorption capacity is being stored in the fluid storage space 12, should a large cooling capacity be needed, this unexpected need can be met by increasing the quantity of refrigerant delivered to the evaporator. In such a case, the dilution effect by the absorber is greater than the concentrating effect by the compressor, and therefore, cooling operation is being carried out by consuming the concentrated absorption fluid stored in the fluid storage space. It is clear that, in the second operational mode, the objective is not the maintenance of concentration of the absorption fluid constant, and includes an operation mode for delay of dilution of the fluid.

Next, the third operational mode will be explained, in which cooling operation is carried out by consuming the stored heat without operating the compressor. This mode of operation is designed to be adopted for providing cooling operation while stopping the compressor during daytime to reduce the peaking electricity consumption. The application of the present operational mode is useful during the peak demand period between noon and four p.m.

Figure 18:
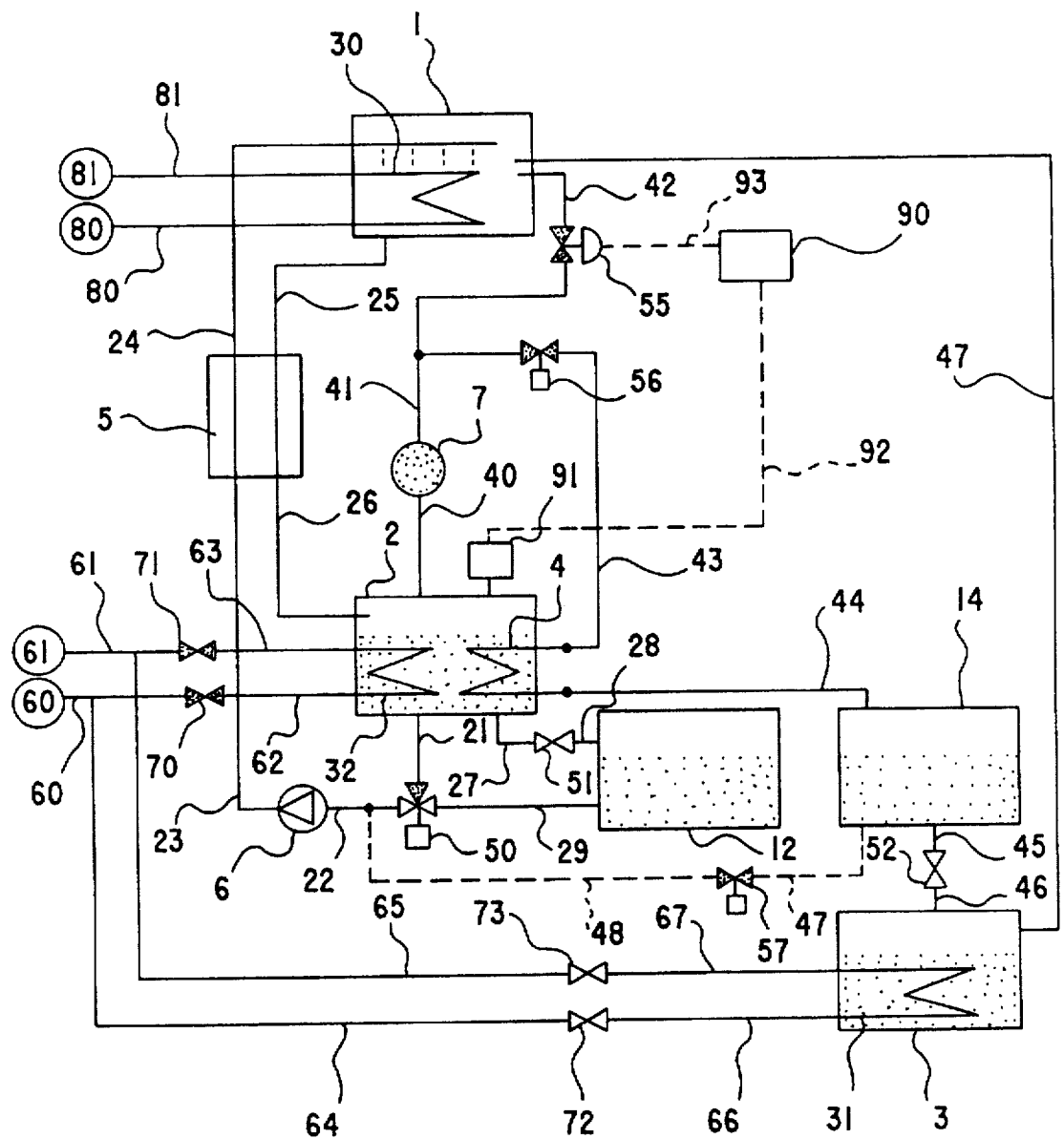
FIG. 18 is a schematic representation showing a third operation mode of the heat pump device of FIG. 12.

FIG. 18 shows the third operational mode of the heat pump in the system. In FIG. 18, the shutoff valve 56 is closed, and the passages 41 and 43 are not communicated. The adjusting valve 55 is closed completely by the action of the controller 90. The shutoff valve 51 is open, and the fluid storage space 12 and the desorber 2 are communicated. The valve 52 is open, and the refrigerant is forwarded to the evaporator 3 from the refrigerant storage space 14. The shutoff valves 72, 73 are open, and the evaporator 3 has chilled water circulating therein. The shutoff valves 70, 71 are closed, and the desorber 2 has no chilled water flowing therein. The three-way valve 50 is closed in the direction of the passage 21, and the desorber 2 and the absorption fluid passage 22 are not communicated directly. The compressor 7 in the heat pump device is stopped but the fluid pump 6 is operated, and the air conditioning section is operated.

Figure 19:
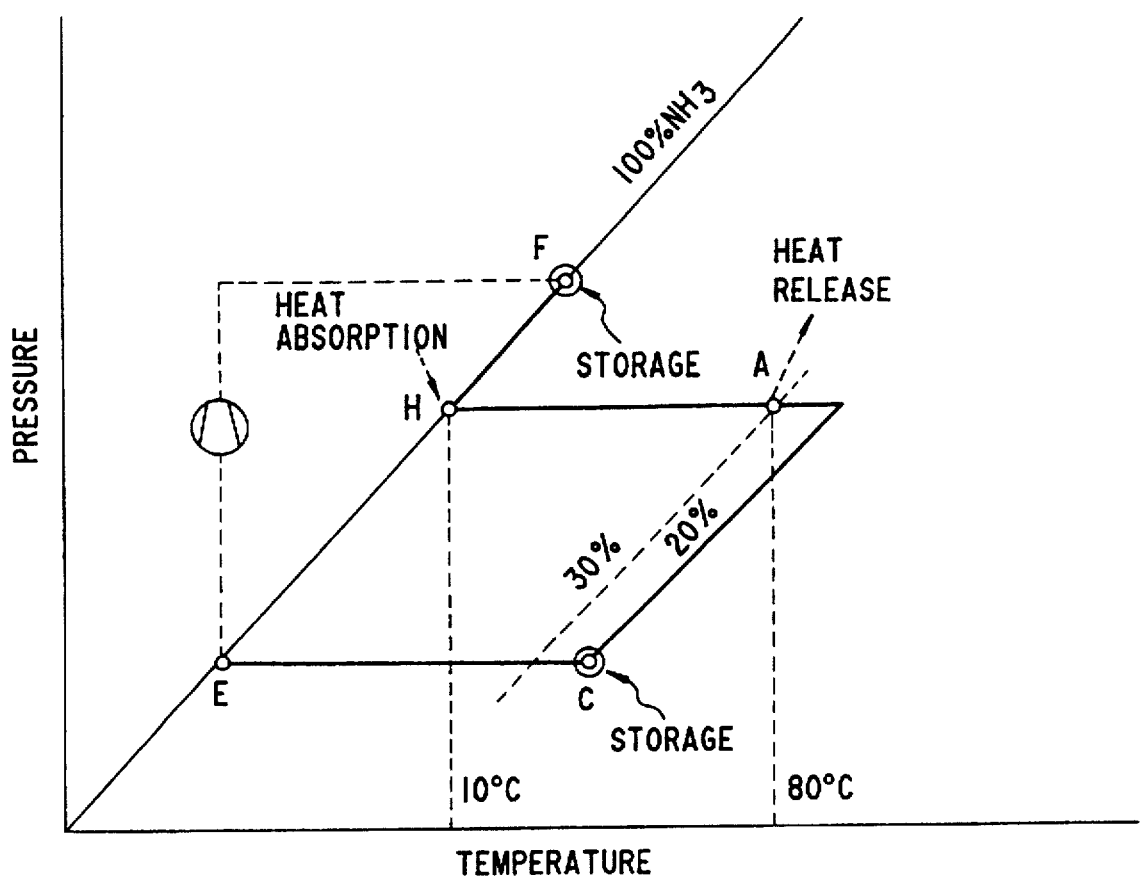
FIG. 19 is a Duhring's diagram showing operation cycles in the operation mode of FIG. 18 for the heat pump device of FIG. 12.

The components of the heat pump device of such a configuration are connected in the same manner as those in a third embodiment shown in FIG. 10, and the Duhring's diagram shown in FIG. 19 is also the same as that for the previous embodiment shown in FIG. 11, and the explanations will not be repeated. The third operational mode also allows air conditioning section to be operated without activating the compressor by dilution of the stored absorption fluid.

A fourth operational mode is adapted to perform cooling without using the stored heat in such a case when the stored heat is consumed. This mode is applied in a period after finishing the third mode in the daytime and until the reduced cost power becomes available. Although the nighttime cost of electrical power is lower, the allowable time band is limited to after midnight. Therefore, when the stored heat is depleted, it is more economical to continue to operate the system without attempting to store heat until the reduced rate becomes available after midnight.

Figure 20:
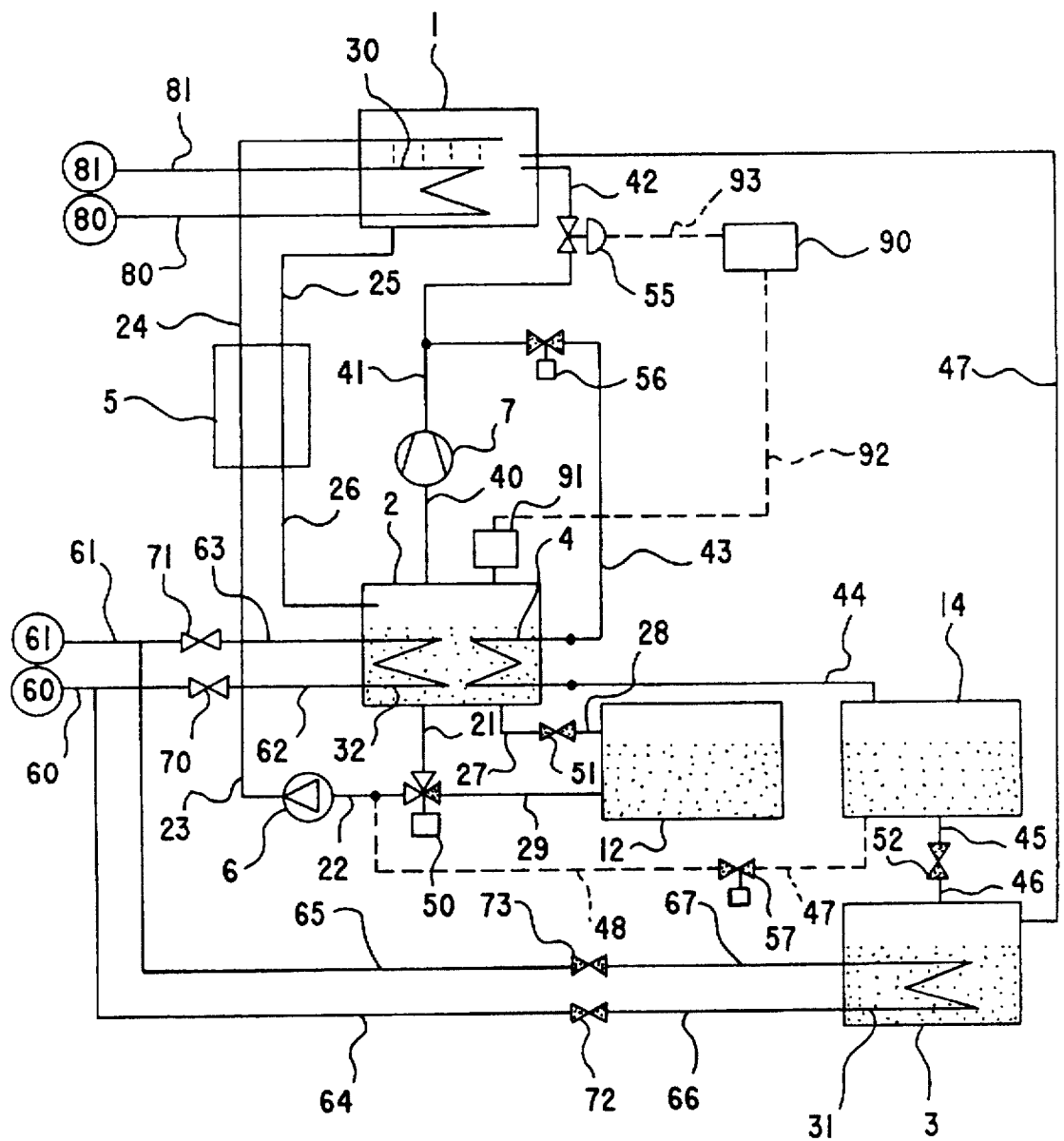
FIG. 20 is a schematic representation showing a fourth operation mode of the heat pump device of FIG. 12.
Figure 21:
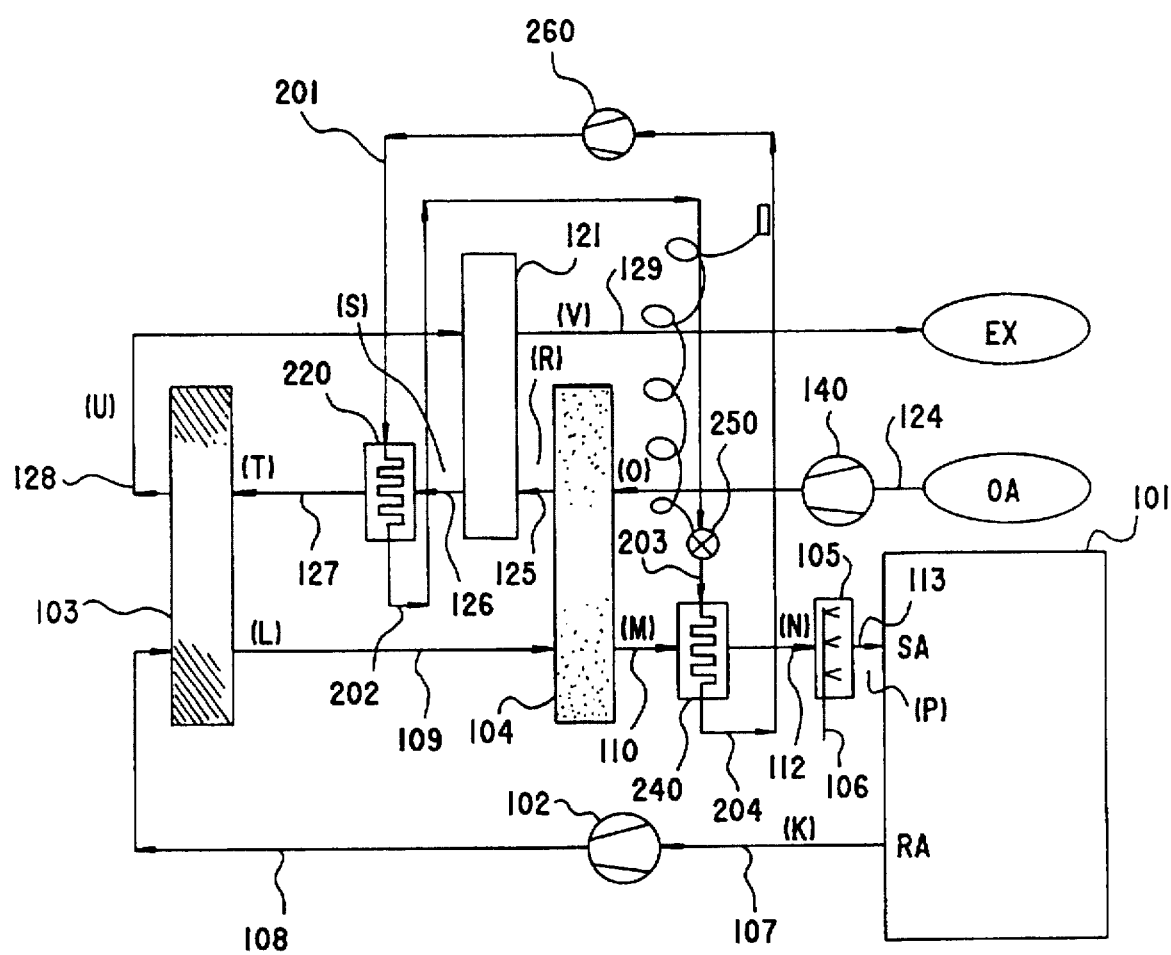
FIG. 21 is a schematic representation showing a desiccant assisted air conditioning system combined with a vapor compression heat pump.

FIG. 20 shows the fourth operational mode of the system, in which the shutoff valve 56 is closed, and the passages 41 and 43 are not communicated. The adjusting valve 55 is opened completely by the action of the controller 90. The shutoff valve 51 is closed, and the fluid storage space 12 and the desorber 2 are not communicated. The valve 52 is closed, and the refrigerant is stored in the refrigerant storage space 14. The shutoff valves 72, 73 are closed, and the evaporator 3 has no chilled water circulating therein. The shutoff valves 70, 71 are open, and the desorber 2 has chilled water flowing therein. The three-way valve 50 is open in the direction of the passage 21, and the desorber 2 and the absorption fluid passage 22 are communicated directly. The compressor 7 in the heat pump device and the fluid pump 6 are operated, and the air conditioning section is operated.

The configuration of the heat pump device is the same as that in the basic embodiment shown in FIG. 1, and the Duhring's diagram is also the same as that for the previous embodiment shown in FIG. 3, and the explanations will not be repeated. The fourth operational mode allows air conditioning section to be operated without storing heat, and therefore the arrangement of the heat pump device allows an economical operation of the system.

As described above, the heat pump device of the present embodiment permits the system to be operated at a reduced pressure by the use of both refrigerant and absorption fluid, and also allows storage of both the absorption fluid and the refrigerant so as to enable storage of chemical potential of the system for use in both cooling and heating. In review of all the embodiments, it has been demonstrated that the first operational mode provides a heat accumulation mode; the second operational mode provides space cooling while performing heat accumulation; the third operational mode provides space cooling while consuming the stored heat; and the fourth operational mode provides space cooling without performing any heat accumulation. The system allows selection of whatever operational mode needed to fulfill the air conditioning requirements.

It will be remembered that in the third operational mode, the absorption fluid concentration at which heat accumulation becomes impossible occurs at a concentration of refrigerant at about 30%. In the fourth operational mode, the absorption fluid becomes inoperable at a refrigerant concentration of about 50%. These examples illustrated two different concentrations, but it is also possible to operate both systems at the reduced value of 30%. However, in such a case, the system is operating at a low overall pressure, and the refrigerant volume withdrawn into the compressor (refrigerant intake volume) is relatively low, and it is possible that the cooling capacity may be insufficient.

Therefore, when transferring the operation from the third mode to the fourth mode, it is desirable to dilute the absorption fluid. In this case, if the absorption fluid in the entire system is diluted and when it is desired to perform heat accumulation at midnight, it is necessary to concentrate a large quantity of the fluid, and the power consumption increases correspondingly. Therefore, in the fourth operational mode, it is preferable that only the minimum quantity of absorption fluid necessary to maintain circulation is diluted, and the remainder of the fluid is left in the fluid storage space 12 at the concentration at the end of the third operational mode. For this reason, the valve 51 and the three-way valve 50 are positioned so as to store the absorption fluid in the fluid storage space 12. In transferring the operation from the third to the fourth mode, it is permissible to dilute the absorption fluid by temporarily opening the valve 57 provided in the passages 48, 49, which join the refrigerant storage space 14 and the absorption fluid passage 22, to mix the absorption fluid with the refrigerant.

Furthermore, in the explanation of the fourth embodiment, the evaporator 3 and the refrigerant storage space 14 are shown separately to clarify their functions, however, it is permissible to integrate the two functions by providing the evaporator 3 with a space to function as the refrigerant storage space 14. In such a case, the same effect is produced by disposing the shutoff valve 52 in FIG. 12 in either the passage 44 or 43, and disposing a new shutoff valve in the passage 47.

Also, the desorber 2 and the fluid storage space 12 are shown separately to clarify their functions, however, it is permissible to integrate the two functions by providing the desorber 2 with a space to function as the fluid storage space 12. In such a case, although it becomes not possible to follow the heat accumulation first mode with the non-heat accumulation and compressor operated fourth operational mode. However, the same effect is obtained when the first mode heat accumulation is followed by the second and third operational modes which rely on the stored heat.

What is claimed is:

1. A heat pump device comprising:
   a desorber for separating a refrigerant as vapor from an absorption fluid;
   a compressor for compressing refrigerant vapor from said desorber;
   an absorber for absorbing the refrigerant vapor in the absorption fluid;
   an absorption fluid passage means for circulating the absorption fluid between said absorber and said desorber;

a refrigerant compression passage for transporting the refrigerant vapor produced in said desorber to said absorber by way of said compressor;

a heat medium passage means for drawing out heat of absorption in said absorber and heat of desorption in said desorber; and a concentration adjusting device including a condenser operative to condense refrigerant vapor by transfer of heat with the fluid in said desorber, a refrigerant condensation passage for transporting at least a portion of the refrigerant vapor compressed by said compressor to said condenser, and a refrigerant storage space for storing the refrigerant condensed in said condenser.

2. A heat pump device comprising:

a desorber for separating a refrigerant as vapor from an absorption fluid;

a compressor for compressing refrigerant vapor;

an absorber for absorbing the refrigerant vapor in the absorption fluid;

an absorption fluid passage for circulating the absorption fluid between said absorber and said desorber;

a refrigerant compression passage for transporting the refrigerant vapor produced in said desorber to said absorber by way of said compressor;

a heat medium passage means for drawing out heat of absorption and heat of desorption in said absorber and/or said desorber;

a concentration adjusting device comprising a condenser heat-exchangeable with the absorption fluid in said desorber for condensing the refrigerant vapor, a refrigerant condensation passage for transporting at least a portion of the refrigerant vapor compressed by said compressor to said condenser, and a refrigerant storage space for storing the refrigerant condensed in said condenser; and further comprising a means to control a quantity of the refrigerant condensed in said condenser.

3. A heat pump device comprising:

a desorber for separating a refrigerant as vapor from an absorption fluid;

a compressor for compressing refrigerant vapor;

an absorber for absorbing the refrigerant vapor in the absorption fluid;

an absorption fluid passage for circulating the absorption fluid between said absorber and said desorber;

a refrigerant compression passage for transporting the refrigerant vapor produced in said desorber to said absorber by way of said compressor;

a heat medium passage means for drawing out heat of absorption and heat of desorption in said absorber and/or said desorber; and a concentration adjusting device comprising a condenser heat-exchangeable with the absorption fluid in said desorber for condensing the refrigerant vapor, a refrigerant condensation passage for transporting at least a portion of the refrigerant vapor compressed by said compressor to said condenser, and a refrigerant storage space for storing the refrigerant condensed in said condenser, wherein said concentration adjusting device further comprises a passage for mixing the refrigerant stored in said refrigerant storage space with the absorption fluid flowing in said absorption fluid passage so as to dilute the absorption fluid.

4. A heat pump device as claimed in claim 1, further comprising a means for adjusting a quantity of mixing of the refrigerant in the absorption fluid.

5. A heat pump as claimed in claim 1, wherein a valve means is provided for changing a flow passage of the refrigerant from said compressor to conduct said refrigerant selectively either to said absorber or to said condenser.

6. A heat pump device comprising:

a desorber for separating a refrigerant as vapor from an absorption fluid;

a compressor for compressing the refrigerant vapor from said desorber;

an absorber for absorbing the refrigerant vapor into the absorption fluid;

an absorption fluid passage means for circulating the absorption fluid between said absorber and said desorber;

a refrigerant compression passage for transporting the refrigerant vapor produced in said desorber to said absorber by way of said compressor;

a refrigerant condensation passage for diverting at least a portion of the refrigerant vapor in said refrigerant compression passage to a condenser operative to condense refrigerant vapor by transfer of heat with the fluid in said desorber, and for transporting the condensed refrigerant to a refrigerant storage space;

an absorption fluid storage passage for transporting an absorption fluid concentrated in said desorber to an absorption fluid storage space;

a refrigerant transport passage for transporting the refrigerant stored in said refrigerant storage space to an evaporator for evaporation therein, and for transporting the refrigerant vapor from said evaporator to said absorber; and a heat medium passage means for transferring heat of absorption generated in said absorber and heat of desorption and/or evaporation generated in at least one of said desorber and said evaporator for an external use;

wherein said heat pump device selectively produces either, a heat accumulation mode of operation in which the absorption fluid concentrated in said desorber is stored, and the refrigerant concentrated in said condenser is stored, or a heat accumulation discharge mode of operation in which the stored absorption fluid is released in said absorber and the stored refrigerant is released in said evaporator.

7. A heat pump as claimed in claim 6, wherein said heat pump device selectively produces either:

a first operational mode in which said compressor is operated to compress the refrigerant vapor to condense it in said condenser so as to concentrate the absorption fluid, and the concentrated absorption fluid is stored in the absorption fluid storage space, and said condensed refrigerant is stored in said refrigerant storage space;

a second operational mode in which said compressor is operated to compress refrigerant vapor to condense it in said condenser so as to concentrate the absorption fluid while the refrigerant in said evaporator is evaporated to be absorbed in said absorber;

a third operational mode in which said compressor is stopped and the refrigerant in said evaporator is evaporated to be absorbed in said absorber; or a fourth operational mode in which said compressor is operated to compress refrigerant vapor from said desorber to be absorbed in said absorber.

8. A heat pump device as claimed in claim 7, further comprising a flow volume adjusting means for selectively adjusting said flow volume of the refrigerant vapor flowing from said compressor into at least one of said absorber and said condenser.

9. A heat pump device comprising:
a desorber for separating a refrigerant as vapor from an absorption fluid;
a compressor for compressing the refrigerant vapor;
an absorber for absorbing the refrigerant vapor into the absorption fluid;
an absorption fluid passage for circulating the absorption fluid between said absorber and said desorber;
a refrigerant compression passage for transporting the refrigerant vapor produced in said desorber to said absorber by way of said compressor;
a refrigerant condensation passage for diverting at least a portion of the refrigerant vapor in said refrigerant compression passage to a condenser heat-exchangeable with the absorption fluid in said desorber, and transporting the condensed refrigerant to a refrigerant storage space;
an absorption fluid storage passage for transporting an absorption fluid concentrated in said desorber to an absorption fluid storage space;
a refrigerant transport passage for transporting the refrigerant stored in said refrigerant storage space to said evaporator for evaporation therein, and transporting the refrigerant vapor to said absorber; and
a heat medium passage means for transferring heat of absorption and heat of desorption and/or evaporation generated in said absorber, said desorber and/or said evaporator for an external use;
said heat pump device further comprising a flow volume adjusting means for adjusting said flow volume of the refrigerant vapor flowing from said compressor into said absorber and/or said condenser wherein said flow volume adjusting means is provided with a pressure sensor operative to sense pressure in said desorber for adjusting said flow volume of the refrigerant vapor in a manner to maintain an output of said pressure sensor at a specific value; and
wherein said heat pump device provides a selection of either:
a heat accumulation mode of operation in which the absorption fluid concentrated in said desorber is stored, and the refrigerant concentrated in said condenser is stored, or a heat accumulation discharge mode of operation in which the stored absorption fluid is released in said absorber and the stored refrigerant is released in said evaporator; and
wherein said heat pump device further provides a selection of either:
a first operational mode in which said compressor is operated to compress the refrigerant vapor to condense it in said condenser so as to concentrate the absorption fluid, and the concentrated absorption fluid is stored in the absorption fluid storage space, and said condensed refrigerant is stored in said refrigerant storage space;
a second operational mode in which said compressor is operated to compress refrigerant vapor to condense it in said condenser so as to concentrate the absorption fluid while the refrigerant in said evaporator is evaporated to be absorbed in said absorber;
a third operational mode in which said compressor is stopped and the refrigerant in said evaporator is evaporated to be absorbed in said absorber; or a fourth operational mode in which said compressor is operated to compress refrigerant vapor from said desorber to be absorbed in said absorber.

10. A heat pump device comprising:
a desorber for separating a refrigerant as vapor from an absorption fluid;
a compressor for compressing the refrigerant vapor from said desorber;
an absorber for absorbing the refrigerant vapor into the absorption fluid;
an absorption fluid passage means for circulating the absorption fluid between said absorber and said desorber;
a refrigerant compression passage for transporting the refrigerant vapor produced in said desorber to said absorber by way of said compressor;
a refrigerant condensation passage for diverting at least a portion of the refrigerant vapor in said refrigerant compression passage to a condenser operative to condense refrigerant vapor by transfer of heat with the fluid in said desorber, and for transporting the condensed refrigerant to a refrigerant storage space;
an absorption fluid storage passage for transporting an absorption fluid concentrated in said desorber to an absorption fluid storage space;
a refrigerant transport passage for transporting the refrigerant stored in said refrigerant storage space to an evaporator for evaporation therein, and for transporting the refrigerant vapor from said evaporator to said absorber;
a heat medium passage means for transferring heat of absorption generated in said absorber and heat of desorption and/or evaporation generated in said absorber, and at least one of said desorber and said evaporator; and
a flow volume adjusting means for selectively adjusting said flow volume of the refrigerant vapor flowing from said compressor into at least one of said absorber and said condenser.

11. A heat pump device comprising:
a desorber for separating a refrigerant as vapor from an absorption fluid;
a compressor for compressing the refrigerant vapor;
an absorber for absorbing the refrigerant vapor into the absorption fluid;
an absorption fluid passage for circulating the absorption fluid between said absorber and said desorber;
a refrigerant compression passage for transporting the refrigerant vapor produced in said desorber to said absorber by way of said compressor;
a refrigerant storage passage for diverting at least a portion of the refrigerant vapor in said refrigerant compression passage to a condenser heat-exchangeable with the absorption fluid in said desorber, and transporting the condensed refrigerant to a refrigerant storage space;
an absorption fluid storage passage for transporting an absorption fluid concentrated in said desorber to an absorption fluid storage space;
a refrigerant transport passage for transporting the refrigerant stored in said refrigerant storage space to said evaporator for evaporation therein, and transporting the refrigerant vapor to said absorber;
a heat medium passage means for drawing out heat of absorption and heat of desorption and/or evaporation generated in said absorber, said desorber and/or said evaporator; and a flow volume adjusting means for adjusting said flow volume of the refrigerant vapor flowing from said compressor into said absorber and/or said condenser wherein said flow volume adjusting means is provided with a pressure sensor in said desorber for adjusting said flow volume of the refrigerant vapor in a manner to maintain the pressure within the desorber at a specific value.

12. A heat pump device as claimed in claim 11, wherein said flow volume adjusting means is operated so that, said flow volume to said absorber is increased when a pressure in said desorber is increasing, and said flow volume to said absorber is decreased when a pressure in said desorber is decreasing.

13. A method of operating a heat pump device having: a desorber for separating a refrigerant as vapor from an absorption fluid; a compressor for compressing the refrigerant vapor; and an absorber for absorbing the refrigerant vapor into the absorption fluid; absorption fluid passage means for circulating the absorption fluid between said absorber and said desorber; a refrigerant compression passage for transporting the refrigerant vapor produced in said desorber to said absorber by way of said compressor; a refrigerant condensing passage for diverting at least a portion of the refrigerant vapor in said refrigerant compression passage to a condenser in heat transfer relation with the fluid in said desorber, and for transporting the condensed refrigerant to a refrigerant storage space; an absorption fluid storage passage for transporting the absorption fluid concentrated in said desorber to an absorption fluid storage space; a refrigerant transport passage for transporting the refrigerant stored in said refrigerant storage space to an evaporator for evaporation therein, and for transporting the refrigerant vapor to said absorber; and a heat medium passage means for drawing out heat of absorption and heat of desorption and/or evaporation generated in said absorber, said desorber and/or said evaporator;

said method including the steps of operating said compressor to compress refrigerant vapor from said desorber so as to concentrate the absorption fluid, conducting a portion of said compressed refrigerant vapor to said condenser to condense it therein, and forwarding a portion of said compressed refrigerant vapor to said absorber.

14. A method of operating a heat pump device having: a desorber for separating a refrigerant as vapor from an absorption fluid; a compressor for compressing the refrigerant vapor; an absorber for absorbing the refrigerant vapor into the absorption fluid; absorption fluid passage means for circulating the absorption fluid between said absorber and said desorber; a refrigerant compression passage for transporting the refrigerant vapor produced in said desorber to said absorber by way of said compressor; a refrigerant condensing passage for diverting at least a portion of the refrigerant vapor in said refrigerant compression passage to a condenser in heat transfer relation with the fluid in said desorber, and transporting the condensed refrigerant to a refrigerant storage space; an absorption fluid storage passage for transporting the absorption fluid concentrated in said desorber to an absorption fluid storage space; a refrigerant transport passage for transporting the refrigerant stored in said refrigerant storage space to an evaporator for evaporation therein, and for transporting the refrigerant vapor to said absorber; and a heat medium passage means for drawing out heat of absorption and heat of desorption and/or evaporation generated in said absorber, said desorber and/or said evaporator;

said method including the steps of: concentrating the absorption fluid in said desorber by operating said compressor to compress the refrigerant vapor from said desorber so as to condense it; conducting at least a portion of said compressed refrigerant vapor to said condenser, and evaporating the refrigerant stored in said evaporator while diverting a portion of the compressed refrigerant vapor into said absorber to be absorbed therein.

* * * * *